United States Patent
Kushch et al.

[11] Patent Number: 6,159,001
[45] Date of Patent: *Dec. 12, 2000

[54] ADVANCED EMISSIVE MATRIX COMBUSTION

[75] Inventors: Alexsandr S. Kushch, Poway; Mark K. Goldstein, Del Mar, both of Calif.

[73] Assignee: Quantum Group, Inc., San Diego, Calif.

[*] Notice: This patent is subject to a terminal disclaimer.

[21] Appl. No.: 09/169,263

[22] Filed: Oct. 9, 1998

Related U.S. Application Data

[63] Continuation-in-part of application No. 08/482,217, Jun. 7, 1995.

[51] Int. Cl.[7] .................................................. F23D 13/12
[52] U.S. Cl. ............................ 431/7; 431/326; 431/329; 126/92 C; 126/92 AC; 122/4 D
[58] Field of Search .................................. 431/7, 170, 100, 431/326, 328, 329; 122/4 D; 126/92 AC, 92 C

[56] References Cited

U.S. PATENT DOCUMENTS

| | | | |
|---|---|---|---|
| 3,704,748 | 12/1972 | Hapgood | 126/116 R |
| 4,776,895 | 10/1988 | Goldstein | 136/253 |
| 4,793,799 | 12/1988 | Goldstein et al. | 431/79 |
| 4,906,178 | 3/1990 | Goldstein et al. | 431/79 |
| 5,356,487 | 10/1994 | Goldstein et al. | 136/253 |
| 5,400,765 | 3/1995 | Goldstein et al. | 126/39 |
| 5,500,054 | 3/1996 | Goldstein | 136/253 |
| 5,662,737 | 9/1997 | Chen | 106/287.18 |
| 5,686,368 | 11/1997 | Wong | 501/152 |

*Primary Examiner*—Carl D. Price
*Attorney, Agent, or Firm*—Christie, Parker & Hale, LLP

[57] ABSTRACT

A superemissive combustion device of this invention comprises a porous distributive layer and an apparatus for delivering a fuel/oxidizer mixture to an upstream face of the porous distributive layer. A superemissive advanced emissive matrix in is disposed within an active flame zone downstream from the porous distributive layer. The emissive matrix is in the form of a three dimensional matrix of radiating bodies that is optically thin to electromagnetic radiation. The emissive matrix is either formed from or includes a coating of a superemissive material that is selected to emit photons within a predetermined wavelength range when thermally stimulated. The emitted photons are received by one or more photovoltaic cells disposed adjacent the matrix.

23 Claims, 19 Drawing Sheets

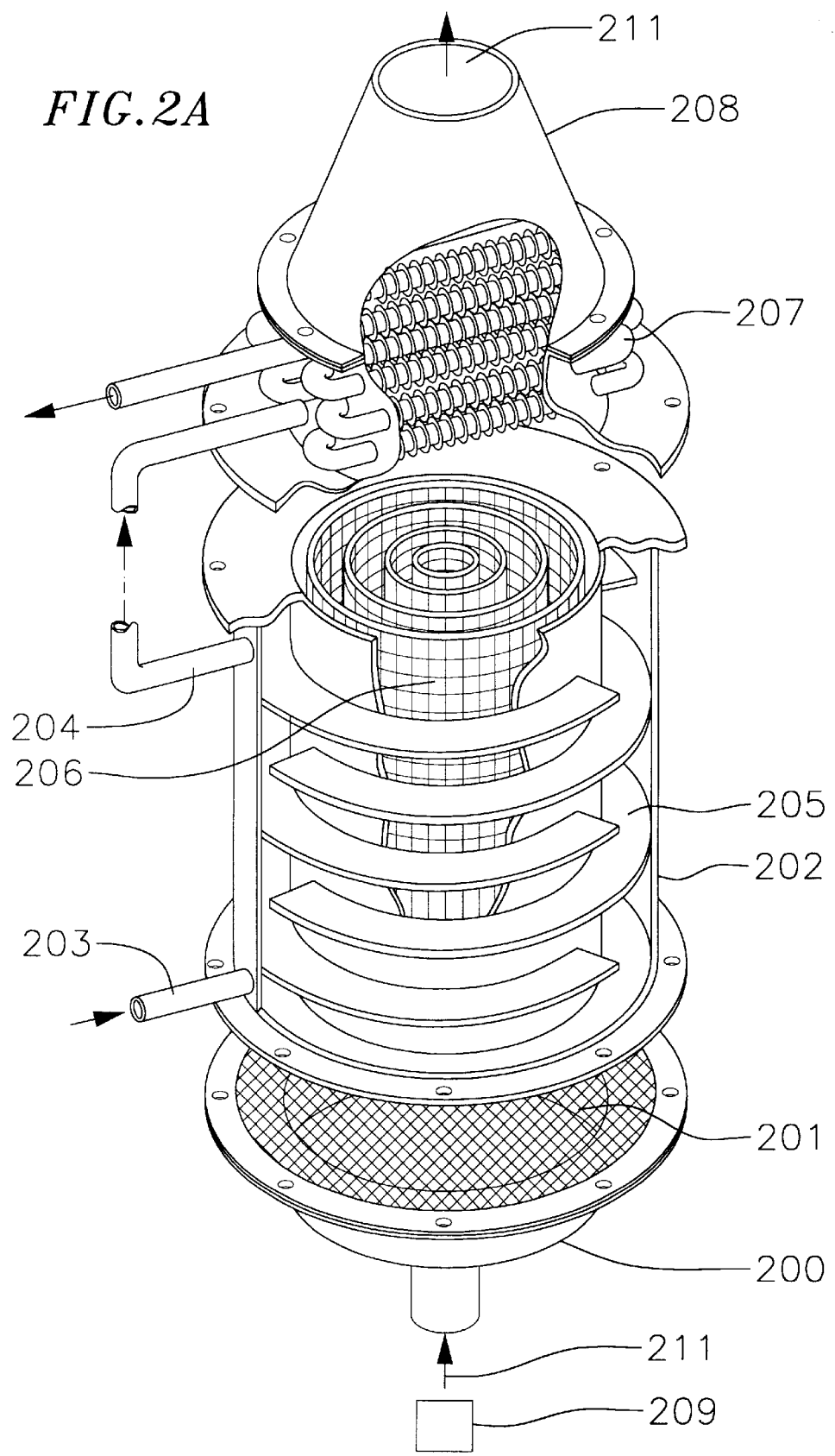

FIG.20A
FIG.20B
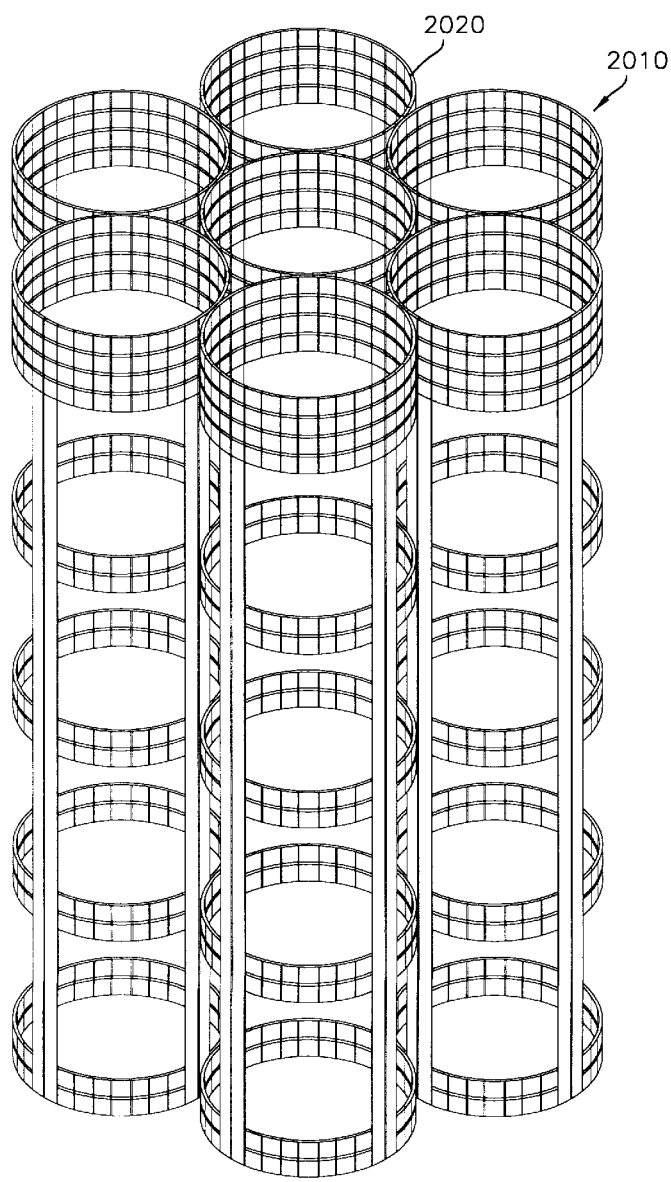
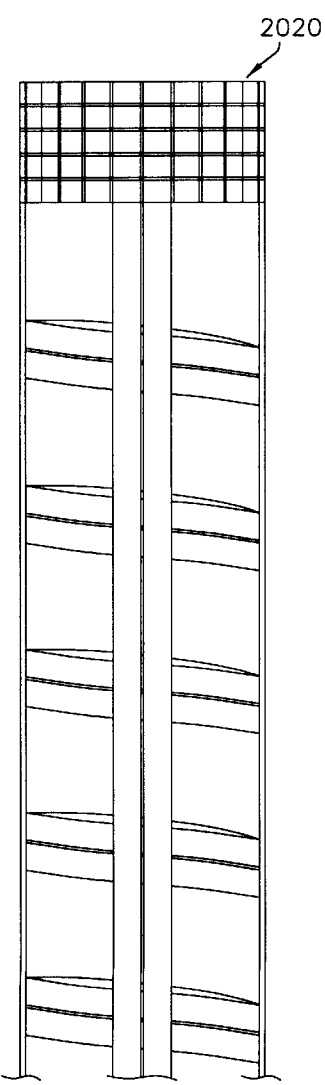

ADVANCED EMISSIVE MATRIX COMBUSTION

RELATION TO COPENDING APPLICATION

This patent application is a continuation-in-part application of U.S. patent application Ser. No. 08/482,217 filed on Jun. 7, 1995.

FIELD OF THE INVENTION

The present invention relates to compact fuel combustion devices and systems having ultra low No, emissions and, more particularly, to compact fuel combustion devices that efficiently emit photons within a desired wavelength range for absorbsion by one or more photovoltaic devices.

BACKGROUND OF THE INVENTION

This invention relates to fuel combustion in boilers, water heaters, steam generators and other fuel/oxidizer mixture fired combustion devices having ultra low $NO_x$ emissions and an exceptionally high firing density. This novel device can be used to make compact, highly efficient, instantaneous water heaters, steam generators, boilers and other fuel/oxidizer mixture fired devices designed to utilize high radiant energy. In the application of this invention, a significantly smaller device can be manufactured, resulting in material and space savings and thus a lower cost.

Conventional fuel/oxidizer mixture fired water heaters, steam generators, boilers and other fired appliances, hereafter referred to collectively as appliances, typically utilize atmospheric or open flame burners. Such appliances are designed to function as convective heat transfer units due to the well known fact that the flame core has a low emissivity. The major portion of the energy released during the combustion process is transferred to the cooling agent, typically water or compressed steam, using convectional heat exchangers. In order to increase the efficiency of such systems, advanced and expensive heat exchangers, such as solid copper finned tube heat exchangers manufactured by Teledyne Laars or coils made of copper tubes with integral fins, are required. The heat transfer rate of such heat exchangers typically ranges from about 10,000 to 14,000 BTU/hr·ft$^2$. High thermal efficiency, with low heat exchanger back pressure, is achieved by having a substantial heat transfer area which increases the overall size of the appliance. For example, the 1.8 million BTU/hr gas fired hot water boiler manufactured by Teledyne Laars, model # HH1825IN09C1A has a footprint of 98"×28" and is 60" tall. Therefore, the specific fuel input (SFI), which is the ratio of the total fuel input (1.8 million BTU/hr) to the base area (2744 in$^2$ or approximately 19 ft$^2$), is about 95,000 BTU/hr·ft$^2$. In a similar product made by the same company, model # PW0400CN12C1CN, with a total fuel input of 400,000 BTU/hr, and a footprint of 40"×26" (base area approximately 7.22 ft$^2$), the SFI is about 55,400 BTU/hr·ft$^2$. The common features of these designs are a rectangular combustion chamber 10 with a set of atmospheric burners 11 placed in the bottom as shown in FIG. 1. The front, back and both side walls of the combustion chamber are made of refractory boards 13 and a solid finned copper tube heat exchanger 14 is located on top. In this manner, the exhaust gases generated by the flame pass through the heat exchanger. Since the ratio of the radiant energy to the total energy released during the combustion process is very low, there is no reason to install additional heat exchangers on the front, back or side walls. The greatest problem with this type of combustion process is that it produces relatively high levels of $NO_x$. These emissions exceed the South Coast Air Quality Management District (SCAQMD) requirements of 30 ppm $NO_x$, and the Clean Air Act Amendment of 1990 (CAAA) requirements of 9 ppm $NO_x$, as well as other $NO_x$ emission regulations.

Well known radiant burners provide combustion with a high radiant efficiency in a narrow range of calorific intensity, usually from 20,000 BTU/h·ft$^2$ (63 kW/m$^2$) to 100,000–200,000 BTU/h·ft$^2$ (315–630 kW/m$^2$), and equivalence ratios between 0.8 and 1.2. Outside of these ranges of equivalence ratio, flames unstably lift up from the burner surface until, eventually, the entire flame lifts up, and the surface becomes non-radiant. The equivalence ratio is the ratio of oxidizer supplied for combustion to the theoretically (stoichiometrically) required amount of oxidizer for complete oxidation of the fuel.

At high thermal loadings, the range of equivalence ratios at which the burner is radiant decreases until eventually the flame lifts off the surface at all equivalence ratios. As a result of this phenomenon, the one major disadvantage of well-known radiant burners is poor turndown. Many radiant burners are able to work with a fixed fuel input, while others usually have turndowns of not more than 3:1. Other deficiencies of these burners are potential flashback problems, high pressure drop, low mechanical strength, thermal shock fragility, and high cost.

In the U.S. patent application entitled, HIGH INTENSITY, LOW $NO_x$ BURNERS, Ser. No. 08/237,306, the contents of which are herein incorporated by reference, Aleksandr S. Kushch and Mark K. Goldstein describe a burner that utilizes an advanced emissive matrix to lower the $NO_x$ emissions and increase the radiant heat output. In terms of high firing density and ultra low $NO_x$ emissions, these burners have outstanding performance. However, the lifetime of these burner systems is shortened by the degradation of the advanced emissive matrix. It is believed that this degradation is due to localized "hot spots" within the matrix. Several different materials, wire diameters and emitter thickness have been tested with the results being the same degradation of the advanced emissive matrix.

Therefore, it is desirable to achieve a combustion process with a high calorific intensity incorporating a high ratio of radiant energy in a wide range of specific fuel inputs under excess oxidizer conditions. Further, the combustion process should not generate $NO_x$ emissions above 30 parts per million. It is also desirable to develop unique boiler/water heater designs that can utilize high radiant energy sources that will result in the savings of space and materials, increase the cost effectiveness of the unit and considerably reduce the emission of atmospheric pollutants for a range of applications from residential to utility size systems. It is further desirable to achieve a combustion device that is capable of producing photon emission within a specific wavelength range for efficient absorbsion by a one or more photovoltaic device for electricity generation.

The inventions disclosed herein have been designed to have the above desired combustion conditions, and/or photon production capability. The application of the inventions disclosed herein include, but are not limited to:

Instantaneous water heaters;

Steam generators;

Thermophotovoltaic generation devices;

Thermophotovoltaic power appliances; and,

Other fuel/oxidizer fired devices designed to utilize a high radiant energy source.

BRIEF SUMMARY OF THE INVENTION

There are, therefore, provided in the practice of this invention according to the presently preferred embodiments, highly efficient, ultra low $NO_x$ combustion devices that may be used for, but are not limited to, water heating, steam generation, thermophotovoltaics, or other devices designed to utilize high radiant energy fluxes.

Generically, the disclosed invention comprises a premixed burner, a three dimensional advanced emissive matrix (AEM), a radiant heat exchanger, and a convective heat exchanger. Two or more elements may be combined together into one structure that does both functions. For example, the radiant heat exchanger may be combined with the AEM structure; the premixed burner may be combined with the AEM; or the burner, AEM and radiant heat exchanger may all three be combined together.

The premixed burner may have a wide variety of shapes and sizes depending on the application. For example, the burner may be, but is not limited to, a box, a flattened cylinder, an elongated cylinder, a cone or a sphere. Each burner has a distributive layer, one face of which receives a fuel/oxidizer mixture. The fuel/oxidizer mixture is delivered to the distributive layer at a sufficient velocity for maintaining a flame front downstream from the distributive layer which thereby remains cool and prevents flashback.

The advanced emissive matrix (AEM) comprises a three dimensional structure of actively cooling bodies that are in the active flame zone downstream of the distributive layer. The AEM may have a variety of shapes, depending on the design of the burner, the shape of the flame zone, the shape of the radiant heat exchanger and the application. The actively cooling bodies that make up the AEM remove the heat of combustion convectively, radiantly, or by a combination of the two processes. When the AEM utilizes the radiant mode of dissipating the heat of combustion, a radiant heat flux emanating from the AEM is generated. The radiant AEM structure should be "optically thin" and therefore allow a majority of the photons generated by the AEM to escape the AEM structure. This energy is captured by radiant heat exchanger(s) or other heat accepting body(s). A superemissive AEM construction is disclosed, wherein the AEM comprises a superemissive material that is selected to emit photons within a predetermined wavelength range upon thermal stimulation. The emitted photons are received by one or more photovoltaic cells for conversion into electricity or electrical energy.

The AEM is designed to have a temperature between about 800° C. and 1500° C. It is within this temperature range that complete combustion occurs and the thermal formation of $NO_x$ is minimized. Below 800 to 850° C. combustion may be incomplete, leaving unburned hydrocarbons to be emitted from the burner. Above about 1500° C., formation of $NO_x$ increases dramatically. Preferably, the flame temperature is in the range of from 1100 to 1200° C. This permits use of metallic bodies in the three dimensional matrix without significant thermal degradation and a reasonably high rate of radiant energy emission.

The radiant heat exchanger(s) absorbs the radiant heat flux and transfers this energy to a cooling agent, thereby heating the cooling agent. The radiant heat exchanger can be integrated into the AEM structure or may be separate structure that surrounds the AEM or a combination of these two structures may be used.

The heat contained in the exhaust gas is recovered by convective heat exchangers. Either conventional combustion or condensed combustion is possible given the principles of this disclosure and therefore within the scope of this invention.

In the first embodiment, the premixed burner comprises a round burner tray with a flat distributive layer placed at one end of a radiant heat exchanger. A radiant mode AEM is suspended above the distributive layer and is encircled by a cylindrical radiant heat exchanger. The radiant heat exchanger comprises two concentric cylinders, one inside the other and sealed together on both ends with a cooling agent inlet and outlet, thereby forming a cooling jacket. Finally, a convectional heat exchanger is at the end of the radiant heat exchanger opposite the premixed burner so that the heat of the exhaust gases can be captured. The AEM may have a variety of different shapes and can be made from, but is not limited to: refractory metal wire or screen; a plurality of spirals of refractory metal wire; a plurality of spiraled rods or tubes of refractory metal or ceramic; a plurality of longitudinally arranged refractory metal wires; a plurality of longitudinally arranged rods or tubes of refractory metal or ceramic; a plurality perforated plates of refractory metal or ceramic; composite structures made of wires, rods, tubes or screens of refractory metal and glass, alumina or ceramic fibers; or, combinations thereof. The role of the AEM is to distribute and stabilize the flame, create a highly emissive body and to cool the active flame zone to prevent the formation of thermal $NO_x$.

One knowledgeable in the art would realize that the circular shape of the above embodiment is not critical to its proper function and is not intended to be limiting. In fact, one could change the shape to be a square, rectangle, octagon, or a variety of other polygonal shapes given the principles of this invention. In light of this, when ultra low $NO_x$ emissions are required in existing appliances, retrofitting with AEM burner technology is practicable, effective and economical.

In the second embodiment of the present invention, the premixed burner comprises a burner in the shape of an elongated cylinder which is coaxial with a cylindrical radiant heat exchanger as described above. The distributive layer may be self-supporting or it may be supported by a perforated portion of the burner tray or the distributive layer may be formed by a perforated portion of the burner tray itself. The premixed burner is inserted into one end of the radiant heat exchanger and is thus surrounded.

The AEM is designed to fit inside of the innermost wall of the radiant heat exchanger so that there is an open space between the distributive layer and the AEM structure. A variety of shapes and orientations for the AEM structure are possible which can be made from, but is not limited to: a plurality of spirals or concentric cylinders of refractory metal screen or wire; a plurality of tubes or rods of refractory metal or ceramic; a plurality of radially arranged sheets of refractory metal screen, or perforated plates of refractory metal or ceramic; a plurality of disks of refractory metal screen or perforated plates of refractory metal or ceramic arranged so that the flow of gas out of the distributive layer is parallel to the plane of the disks or plates; composite structures made of wires, rods, tubes or screens of refractory metal and glass, alumina or ceramic fibers; or combinations thereof.

A convective heat exchanger is at the other end of the radiant heat exchanger, i.e., opposite the side in which the burner tray/distributive layer has been inserted, to recover heat from the exhaust gases.

One advantage of this embodiment is that the fuel/oxidizer mixture is introduced along the central axis of the system, thereby creating a more uniform distribution of the flame within the AEM structure. A second advantage of this embodiment is that a more compact unit with a wide range of SFI can be built than the first embodiment described.

In a third embodiment of the disclosed invention, the premixed burner comprises a burner tray into which a perforated cylinder is inserted thus forming the burner. On either surface of the perforated cylinder is the distributive layer. This creates a premixed burner which is inwardly fired.

The AEM is placed in the central portion of the inward firing burner and can be made from, but is not limited to: a plurality of disks made of refractory metal wire screen; a plurality of perforated disks or plates of refractory metal or ceramic; concentric cylinders made from refractory wire screen or perforated metal sheets; a plurality of spiraled or coiled refractory metal wire; a plurality of coiled rods or tubes made of refractory metal or ceramic; a plurality of longitudinal rods or tubes of refractory metal or ceramic; composite structures made of wires, rods, tubes or screens of refractory metal and glass, alumina or ceramic fibers; or, combinations thereof. The radiant heat exchanger may be separate, integrated into the AEM structure or both.

The exhaust gases from the combustion process are passed through convective heat exchanger(s) to capture the heat in the exhaust gases. This embodiment is especially well suited for photovoltaic electricity generation and industrial applications.

In a fourth specific embodiment, the burner takes the shape of a perforated convex or concave sphere, ¾ sphere or hemisphere, cone or other similar shapes into which the fuel/oxidizer mixture is introduced. The distributive layer may be self supporting or may be supported by a perforated surface of the burner tray. The flame front thus generated by this burner has, for the most part, the same shape as the distributive layer. The burner is inserted into a radiant heat exchanger and is also surrounded by an AEM structure.

The AEM structure may be arranged spherically around the burner and can be made from, but is not limited to, a wide variety of refractory materials, for example: a plurality concentric spheres of refractory wire screen; a plurality of radially arranged rods or tubes of refractory metal or ceramic; composite structures made of wires, rods, tubes or screens of refractory metal and glass, alumina or ceramic fibers; or, combinations thereof.

The usefulness of this invention is not limited to residential (i.e. units rated up to 75,000 BTU/hr) applications. Indeed systems designed for small industrial, institutional and commercial boilers, steam generators and process heaters (i.e. units rated from 2,000,000 BTU/hr up to 5,000,000 BTU/hr),or industrial institutional and commercial boilers, steam generators and process heaters (units rated to be equal to or greater than 5,000,000 BTU/hr) can use AEM technology. Modular units comprising a premixed burner, an AEM and a radiant heat exchanger are within the scope of this invention. In this way, the $NO_x$ emissions of these systems can be significantly reduced, thereby lowering the cost of operation and reducing the impact on the environment.

DESCRIPTION OF THE DRAWINGS

These and other features and advantages of the present invention will be appreciated as the same becomes better understood by reference to the following detailed description when considered in connection with the accompanying drawings wherein:

FIGS. 2A and 2B illustrate in cutaway perspective the first embodiment of the present invention using a round flat premixed burner.

FIGS. 20A and 20B illustrate a schematic perspective side view of a tubular superemissive AEM, and a tube element used to construct the same respectively, prepared according to principles of this invention.

DETAILED DESCRIPTION OF THE INVENTION

Figure 1:
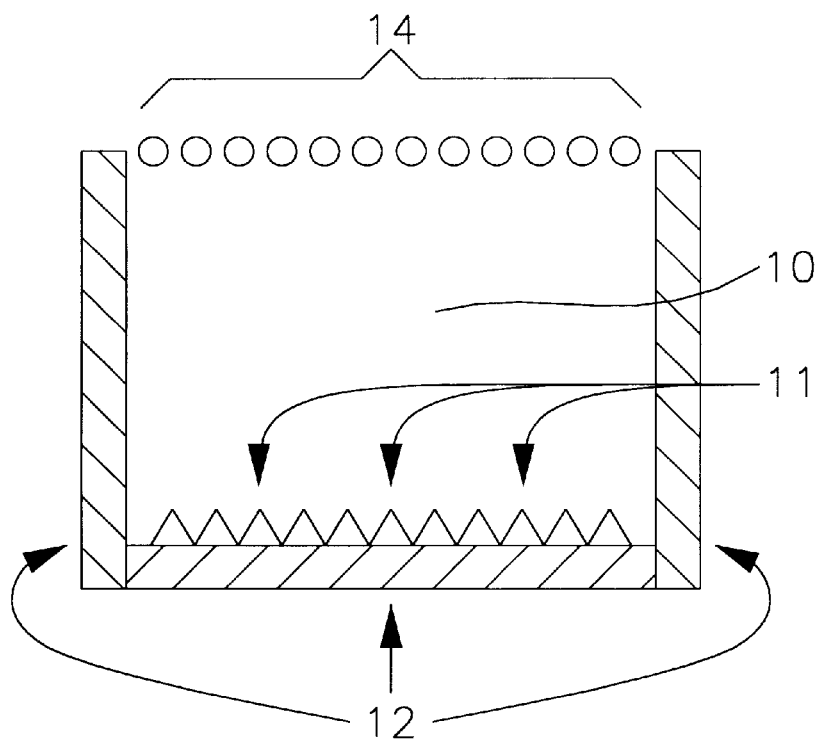
FIG. 1 illustrates in transverse cross-section a Teledyne Laars water heater/boiler with an atmospheric burner system.

The inventors have achieved stable combustion in a wide range of specific fuel input with low $NO_x$ emissions, by designing a combustion system that provides the following:

1. To achieve flame stabilization in a broad range of specific fuel input, the combustion device has: (a) means for creating a range of combustible mixture velocities that is wider than the range of the flame propagation velocities; or, (b) means for creating and maintaining multiple vortex zones of varying intensity in the volume downstream of the distributive layer; or, (c) a combination of both (a) and (b), for all operating conditions. This is achieved by placing a three dimensional structure (i.e., a matrix) within the area downstream of the distributive layer that disrupts the flow of the fuel/oxidizer mixture downstream of the distributive layer.

2. In order to minimize the N. emissions, the active flame zone (flame core) should be saturated with actively cooling bodies (i.e., an advanced emissive matrix, AEM). The AEM dissipates the energy of combustion away from the active flame zone, thereby cooling this zone. The actively cooling bodies can remove the heat of combustion convectively (i.e., through cooling tubes) or radiantly (i.e., through a radiant heat flux) or by a combination of these two methods. The temperature of the active flame zone should be reduced below 1500° C., thereby reducing the formation of thermal $NO_x$.

3. When the actively cooling bodies in the flame zone (i.e., the AEM) dissipate energy in the form of a radiant heat flux, the structure must allow a major portion of the photon emissions to escape from the AEM. That is to say, the AEM must be "optically thin", thereby ensuring that localized "hot spots" do not occur. By doing this, degradation of the AEM is avoided.

In addition to placing the AEM structure in the active flame zone, the present invention further reduces the $NO_x$ emissions by the use of excess oxidizer in the fuel/oxidizer mixture. This technique is well known in the art as a means for reducing the formation of thermal and prompt $NO_x$.

Generically, the present invention comprises a premixed burner, an advanced emissive matrix (AEM), a radiant heat exchanger, and a convective heat exchanger. A wide variety of shapes, sizes, and configurations are possible within the generic scope of this invention.

The premixed burner comprises a burner tray and a porous distributive layer, one face of which receives the fuel/oxidizer mixture. As the name implies, the distributive layer distributes the fuel/oxidizer mixture as evenly as possible across its surface, thereby forming a relatively uniform flow of fuel/oxidizer mixture for ignition and subsequent combustion. Ignition followed by combustion takes place downstream of the distributive layer immediately before the AEM or within the open spaces of the AEM structure depending on the velocity of the fuel/oxidizer mixture and the manner in which the fuel/oxidizer mixture flows into the AEM. The AEM structure itself comprises actively cooling bodies designed to absorb the heat of the combustion process is taking place in close proximity. These bodies are arranged in a three dimensional array so that there are open spaces therebetween in which combustion can take place. The open matrix structure of the AEM: (1) creates a range of combustible mixture velocities that is wider than the range of the flame propagation velocities; (2) creates and maintains multiple vortex zones of varying intensity; or a combination of (1) and (2) in the volume downstream of the distributive layer. Because of the intense heat generated in the combustion process, the AEM structure is typically made of refractory metal, ceramic, metal and ceramic composites or other high temperature resistant materials. The AEM may be made of solid or hollow heat absorbing bodies or combinations thereof. When hollow bodies are used to make the AEM, a cooling agent can be caused to flow therein. By doing this, the hollow body structure of the AEM convectively removes the heat of combustion and also serves as a integrated radiant heat exchanger. The AEM can also be made of solid bodies and thereby function as a source of radiant energy by absorbing the heat of combustion and then emitting this energy as radiant energy flux in the form of electromagnetic radiation. The AEM is considered to be acting as a radiant heat source when at least 20% of the total heat of the fuel input is emitted as radiant energy. For the AEM to be effective under these conditions, it must be "optically thin" meaning that the structure should allow the passage of a majority of the photons out of the structure. This helps to prevent the formation of localized "hot spots". This latter point is important because the elimination of hot spots helps to reduce the temperature of the AEM and thus the active flame zone, and prolongs the lifetime of the AEM structure. By absorbing the heat of combustion, the AEM cools the active flame zone and thus helps to prevent the formation of thermal $NO_x$. Optimally, the AEM structure has a temperature between 800° C. and 1500° C. Within this temperature range, complete combustion occurs and the formation of thermal $NO_x$ is minimized.

The radiant energy flux generated by the AEM is absorbed by the radiant heat exchanger or a plurality of radiant heat exchanger(s). The radiant heat exchangers transfer the absorbed radiant energy to a cooling agent, such as water, compressed steam, air, or gas, thus heating the cooling agent.

The exhaust gases resulting from the combustion process are directed by means of a exhaust manifold to flow through a convective heat exchanger. The convective heat exchanger captures the heat contained in the exhaust gases and transfers the energy to the cooling agent. The structure of the convective heat exchanger may comprise simple tube construction or finned tube construction.

Although described for the most part as individual structures with specific roles, the combination of structures together is possible and within the scope of this invention. Examples of such structure include, but are not limited to: the premixed burner and the AEM may be combined together to form one structure serving both functions; the radiant heat exchanger and the AEM may be combined together; or the burner, AEM and radiant heat exchanger may be combined together with different parts of the same structure serving in the appropriate functions.

Figure 2B:
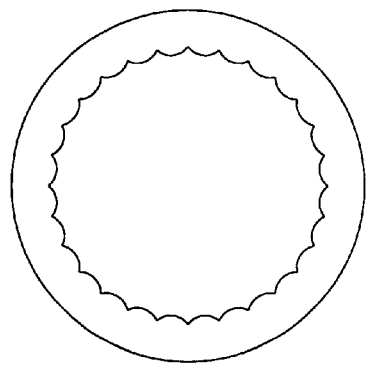

FIG. 2 schematically illustrates the first specific embodiment of the disclosed invention in which a circular burner tray 200 and flat distributive layer 201 are combined to form the premixed burner. The distributive layer may be made of, but is not limited to: wire or ceramic cloth, a perforated disk of metal or ceramic; a porous ceramic foam; a porous composite disk comprising glass, ceramic or alumina fibers bound to a metal support; or a felt made from glass or alumina fibers. The premixed burner is attached to one end of a cylindrical radiant heat exchanger 202 (i.e., a cooling jacket) made of two coaxial metal tubes one inside the other that are sealed together at both ends. A cooling agent enters via the coolant inlet 203, and flows through a series of flow diverters 205 finally reaching the outlet 204. The inner tube used to make the radiant heat exchanger may be either smooth or corrugated to increase the surface area as shown in FIG. 2b. By increasing the surface area of the radiant heat exchanger, a greater amount of radiant heat can be absorbed and thus transferred to the cooling agent. Suspended above the distributive layer 201 and encircled by the radiant heat exchanger 202 is the advanced emissive matrix (AEM) 206.

Figure 3A:
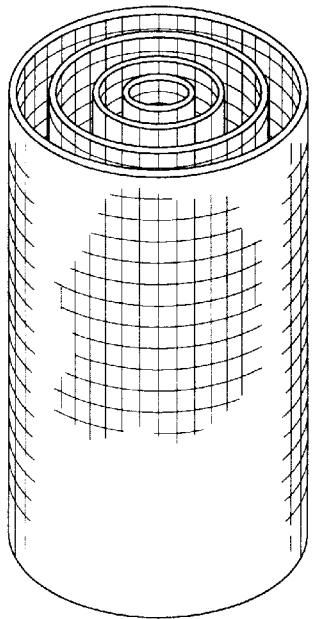
FIGS. 3A to 3D illustrate several advanced emissive matrix structures for use with the first embodiment of the present invention shown in FIG. 2.
Figure 3C:
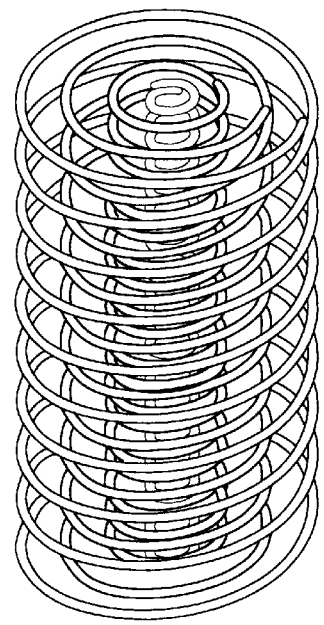
Figure 3B:
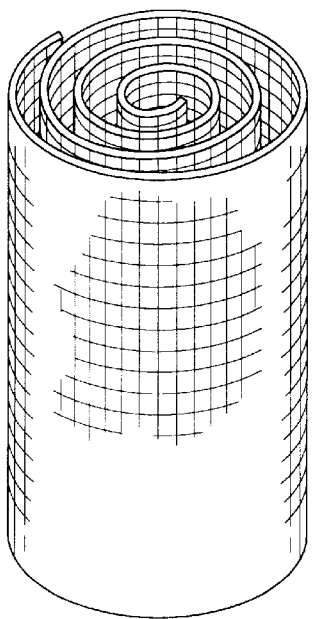
Figure 3D:
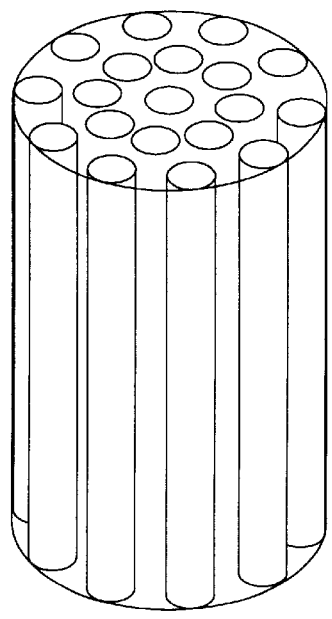

In FIG. 2 the AEM structure has been made of concentric refractory wire screen cylinders. Examples of other possible AEM structures, which are given to further illustrate, but not limit the scope of this disclosure, are given in FIG. 3. FIG. 3a shows the AEM structure of FIG. 2 removed from the radiant heat exchanger. FIG. 3b shows a different AEM structure comprising refractory metal wire screen that has been coaxially coiled in a spiral to fit within the radiant heat exchanger. FIG. 3c illustrates an AEM structure made from concentrically helically coiled rods or tubes of refractory metal or ceramic. Lastly, FIG. 3d shows an AEM structure of longitudinally arranged rods or tubes of refractory metal or ceramic. When tubes or other hollow bodies are used in the AEM, as in the last two examples, these hollow bodies may be used as a means of introducing a cooling agent into the AEM. Variations or combinations of these examples will be apparent to one knowledgeable in the art, given the disclosure of this invention and therefore are within the scope of this invention.

On the end of the radiant heat exchanger opposite the premixed burner, a convective heat exchanger 207 has been attached in order to capture the heat in the exhaust as it exits through the exhaust manifold 208. The convective heat exchanger as illustrated is of solid finned tube construction. However, simple tube or a combination of simple tube and finned tube construction may be used.

In operation, a premixed fuel/oxidizer mixture 210 is introduced into the burner tray 200 by means of a blower 209. The fuel/oxidizer mixture then passes through the distributive layer 201 and is ignited just before or within the open spaces of the AEM 206. The flame stabilizes in the open spaces of the AEM, the position of which depends on the velocity of the fuel/oxidizer mixture and the propagation velocity of the flame front. The AEM, being heated by the close proximity of the combustion processes, begins to emit radiant energy in the form of electromagnetic radiation, which cools the flame zone and reduces the thermal $NO_x$ formation. The radiant energy flux, thus generated, is captured by the radiant heat exchanger 202 surrounding the AEM. The radiant heat exchanger transfers this absorbed energy to the cooling agent, thus heating the cooling agent and cooling the radiant heat exchanger simultaneously. The exhaust gases 211, before being directed away by the exhaust gas manifold 208, pass through the convective heat exchanger 207. In this way, the heat remaining in the exhaust gas is captured for use.

Figure 4:
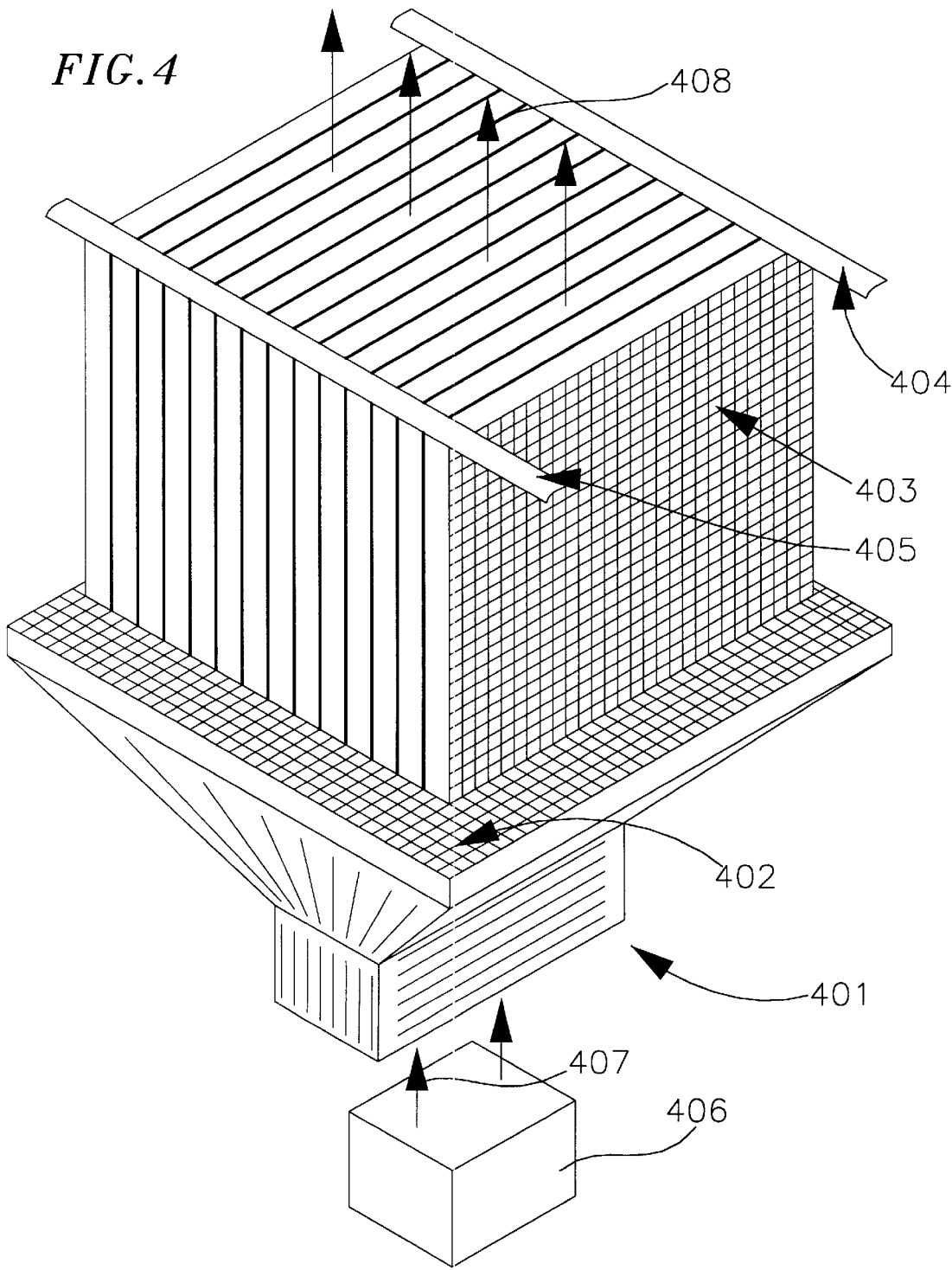
FIG. 4 illustrates the first embodiment of the present invention using a rectangular flat premixed burner.

The shape of the premixed burner, radiant heat exchanger and convective heat exchanger need not be limiting. FIG. 4 illustrates the use of a rectangular burner tray 401 with a corresponding distributive layer 402. For clarity purposes, the surrounding box shaped radiant heat exchanger, the convective heat exchanger and the exhaust manifold have not been included in this illustration. The AEM 403 comprises, but is not limited to: sheets of refractory metal wire screen; perforated plates of refractory metal or ceramic; composite structures made of wires or screens of refractory metal and glass, alumina or ceramic fibers; or, combinations thereof. The AEM elements are suspended above the distributive layer by means of metal or ceramic rods or tubes 404 and 405. Tubes are preferred because a cooling agent can flow therein and thus the tubes help to remove heat from the AEM structure. A plurality of tubes could also be used in this manner.

Once again, in the operation of this embodiment a premixed fuel/oxidizer mixture 407 is delivered to the burner tray 401 by means of a blower 406. After passing through the distributive layer 402, the fuel/oxidizer mixture ignites just before entering, or within the open spaces of the AEM 403. The flame forms and stabilizes within the open spaces of the AEM structure thereby stimulating the AEM to emit radiant energy. This radiant energy flux is absorbed partially by the cooling tubes within the structure 404 and 405, but is mainly captured by the radiant heat exchanger that surrounds the AEM. (not shown) The exhaust gases 408 then pass through the exhaust manifold (not shown) and the convective heat exchanger (not shown) so that the heat contained in the exhaust gases can be captured.

Although this embodiment has been described and illustrated in a upright configuration for conventional combustion, one knowledgeable in the art would realize that by inverting the system, i.e. placing the premixed burner on top and placing the convective heat exchanger on bottom, a condensed combustion unit would be formed. Therefore, such a configuration is within the scope of this invention. In fact by doing this an ultra high efficiency, ultra low $NO_x$ emission unit can be created.

Figure 5:
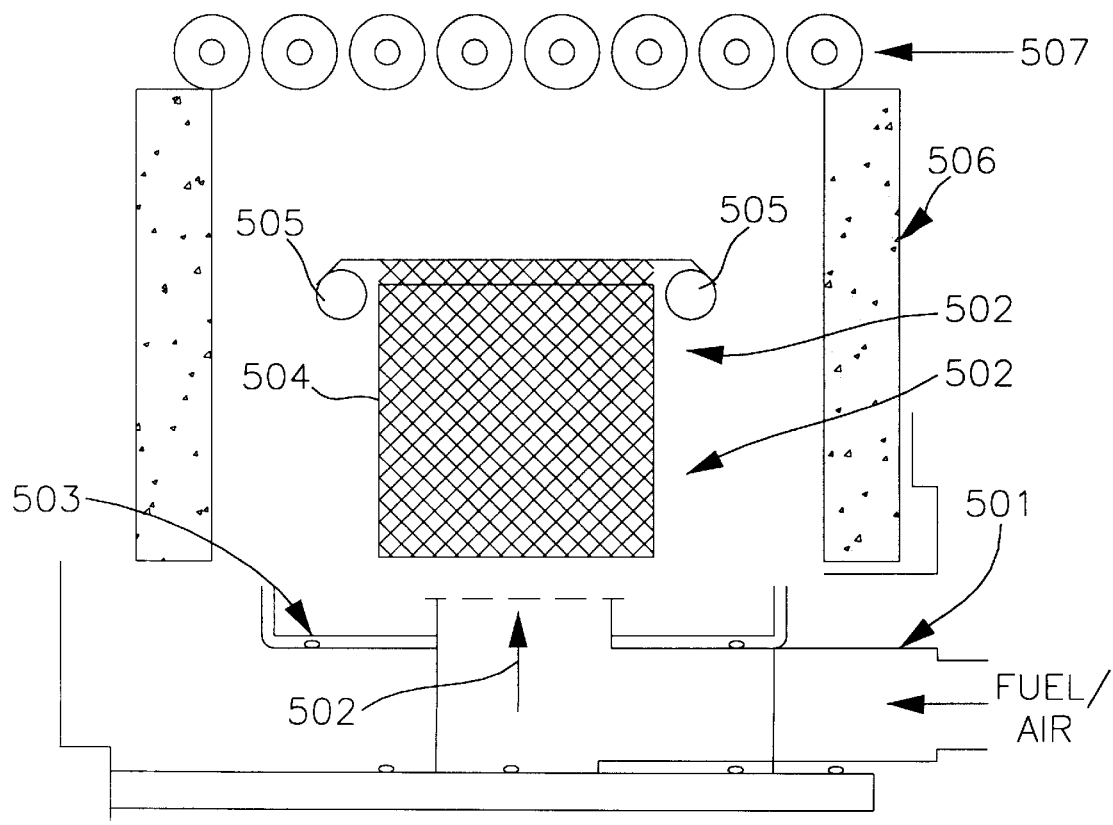
FIG. 5 illustrates in cross section the retrofitting of a Teledyne-Laars 1.8 million BTU/hr water heater

When low $NO_X$ emissions are required, it may be more desirable, economical and feasible to retro-fit an existing water heater, boiler, or steam generation unit with AEM technology rather than utilize flue gas recirculation systems or post combustion treatment technology, such as, selective catalytic reduction, selective non-catalytic reduction, non-selective catalytic reduction, and other similar technologies. In most cases, the existing atmospheric burners are replaced with a suitably shaped premixed burner 501 and distributive layer 502 as shown in FIG. 5. A protective layer 503 comprising a sheet or coating of reflective metal, metal tubes in which a cooling agent may flow, or a combination of these protect the burner from the radiant heat of the AEM, thus preventing flashback of the fuel/oxidizer mixture. The AEM 504 is situated above the burner at a position optimized for the unit's fuel input range. The shape of the AEM is designed so that a uniform distribution of heat occurs within the matrix and may be made from, but is not limited to: refractory metal wire or screen; a plurality of coils of refractory metal wire; a plurality of coiled rods or tubes of refractory metal or ceramic; a plurality of longitudinally arranged refractory metal wire; a plurality of longitudinally arranged rods or tubes of refractory metal or ceramic; a plurality of perforated plates of refractory metal or ceramic; composite structures made of wires, rods, tubes or screens of refractory metal and glass, alumina or ceramic fibers; or, combinations thereof. The AEM illustrated in FIG. 5 comprises sheets of refractory metal wire screen, or sheets or plates of perforated refractory metal or ceramic, 504 supported by a plurality of rods or tubes of refractory metal or ceramic 505. The walls of the original unit 506, are typically made of refractory material. During the retrofit process, the original walls and convectional heat exchanger 507 are normally not replaced, which makes the retrofit much easier and less expensive.

Figure 6:
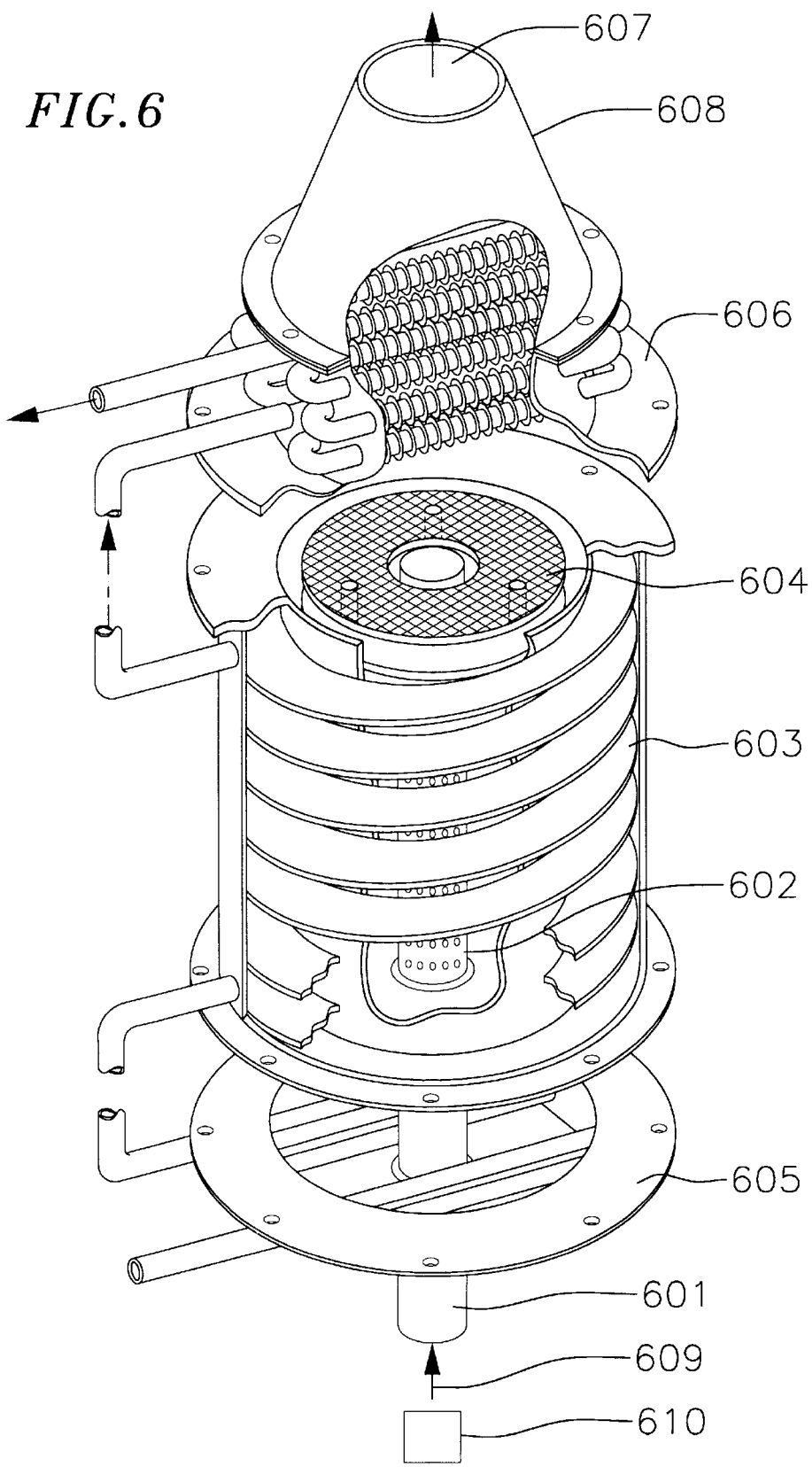
FIG. 6 illustrates the second embodiment of the present invention using a cylindrical outward firing premixed burner.

A second specific embodiment of the presently disclosed invention is shown in FIG. 6, which uses a cylindrically based outward firing (COF) burner. The premixed burner comprises a hollow cylindrical burner tray 601, one end of which is perforated. The perforated end of the burner 602 may be made from, but is not limited to: a suitably shaped refractory metal or other metal wire screen; a perforated tube of refractory metal or ceramic; a suitably shaped self-supporting refractory metal or ceramic cloth or felt; composite structures made of wires, rods, tubes or screens of refractory metal and glass, alumina or ceramic fibers; or combinations thereof with a tubular shape. When the holes in the perforated portion of the burner are too coarse to serve as a distributive layer, a sock made of ceramic, glass or metal fiber felt or cloth may be used or the distributive layer may be made by vacuum forming ceramic, alumina or glass fibers onto the surface. Such vacuum forming technology is essentially described by Goldstein, et al. in the U.S. Pat. No. 5,400,765 and No. 5,356,487 the contents of which are hereby incorporated by reference. The burner is inserted co-axially into a cylindrical radiant heat exchanger 603, as previously described. The relative length of the burner tray/distributive layer, as compared to the length of the radiant heat exchanger, depends upon a number of factors, including: the relative diameter of the burner tray and distributive layer, the desired range of specific fuel input, the velocity of the fuel/oxidizer mixture, the structure of the AEM and other factors. Typically the relative length of the burner tray/distributive layer is between about 10% and about 95% the length of the radiant heat exchanger.

The AEM 604 is designed to fit inside of the radiant heat exchanger and around the burner. Its structure comprises a plurality of spirals or concentric cylinders of refractory metal screen or wire; a plurality of tubes or rods of refractory metal or ceramic; a plurality of radially arranged sheets of refractory metal screen, or perforated plates of refractory metal or ceramic; a plurality of disks of refractory metal screen or perforated plates of refractory metal or ceramic arranged so that the flow of gas out of the distributive layer is parallel to the plane of the disks or plates; composite structures made of wires, rods, tubes or screens of refractory metal and glass, alumina or ceramic fibers; or combinations thereof. When the AEM is made of sheets, the sheets may be either flat or corrugated.

Figure 7A:
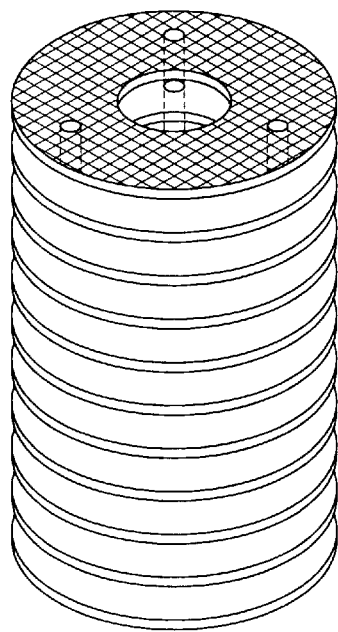
FIGS. 7A to 7D illustrate several advanced emissive matrix structures for use with a cylindrical outward firing premixed burner
Figure 7B:
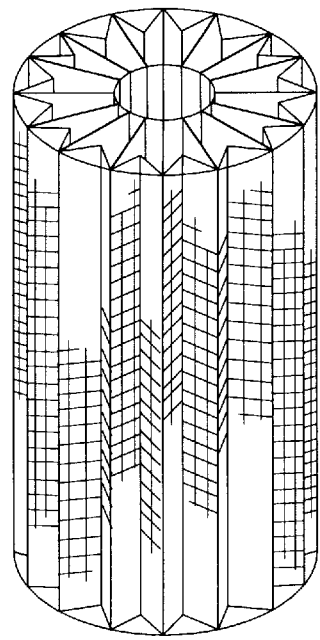

As partially illustrated in FIG. 6 and fully illustrated in FIG. 7a, the AEM is made of disks of refractory metal wire screen or perforated plates of refractory metal or ceramic that are stacked co-axially so that the flow of the fuel/oxidizer mixture is initially parallel to the plane of the disks/plates. Rods or tubes of metal or ceramic are used to support the structure. When tubes are used, a cooling agent can be allowed to flow through the tubes as supplemental cooling of the AEM.

Several different AEM structures are possible and are illustrated in FIG. 7 removed from the radiant heat exchanger. FIG. 7a shows the complete AEM structure partially illustrated in FIG. 6 and described above. FIG. 7b illustrates an AEM structure that comprises a plurality of radially arranged sheets of refractory metal wire screen or perforated sheets of refractory metal or ceramic. The outer edges of the sheets are connected together with a plurality "V" shaped pieces made of the same material. The inner edges of the sheets may be connected together by a cylindrical refractory wire screen, a perforated tube of refractory metal or ceramic or small circular rings of refractory metal. The additional elements function not only as a means of structural support, but also as additional radiant surfaces in the AEM structure.

Figure 7C:
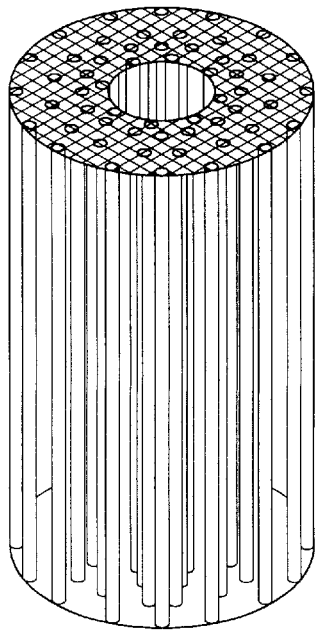
Figure 7D:
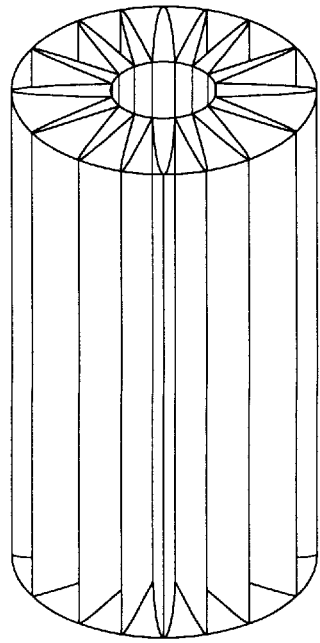

FIG. 7c illustrates an AEM which has been constructed of longitudinally arranged refractory metal wire, refractory metal wire or ceramic rods, tubes of refractory metal or ceramic, or combinations thereof. Disks of refractory metal wire screen or perforated plates of refractory metal or ceramic at either end support and hold the elements in place. When tubes are used, a cooling agent can be caused to flow therein to provide supplemental cooling to the AEM structure. A similar structure is shown in FIG. 7d and is made by corrugating a sheet of refractory metal wire screen or perforated refractory metal and then forming the corrugated sheet into a cylinder. The corrugations do not have to be of equal height and may be curved or pointed. Given the principles of this invention, a person knowledgeable in the art could create a wide variety of different AEM structures by combining the above elements and are therefore within the scope of this invention.

On the same end of the radiant heat exchanger into which the burner has been inserted, an end piece 605 has been affixed to capture or reflect the radiant heat that would otherwise escape. The end piece comprises a sheet of reflective metal, or a ceramic or metal piece onto which a reflective coating has been placed, or a metal plate onto which cooling tubes are attached, or combinations thereof. Besides serving to contain radiant heat, the end piece also helps to prevent flashback of the fuel/oxidizer mixture by preventing its premature heating. On the opposite end of the radiant heat exchanger is a convective heat exchanger 606 to capture the heat contained in the exhaust gases 607 leaving through the exhaust manifold 608.

In operation, the fuel/oxidizer mixture 609 is introduced into the burner 601 by means of a blower 610. The fuel/oxidizer mixture then passes through the distributive layer 602 and is directed radially outward with sufficient velocity so that it ignites just before or in the open spaces of the AEM structure 604. The combustion process taking place in the open spaces of the AEM heats the structure, thereby, creating a radiant heat flux. The radiant heat flux is captured by the surrounding radiant heat exchanger 603 which transfers the energy to the cooling agent. The exhaust gases 607 flow out and pass through the convective heat exchanger 606 before being directed away by the exhaust manifold 608.

There are several advantages to having a system in which the fuel/oxidizer mixture is introduced along the central axis of the radiant heat exchanger. First, by doing so a more uniform distribution of flame, and therefore heat, occurs within the AEM. In this way, a greater portion of the AEM becomes radiant than if the burner is placed at one end. In addition, localized hot spots are less likely to form due to the more uniform distribution. Another advantage of this method of introducing the fuel/oxidizer mixture is that the fuel/oxidizer mixture is flowing, for the most part, radially outward upon ignition. Therefore, before being able to exit through the convectional heat exchanger and exhaust manifold, the flow needs to make a 90° change of direction. Due to this, more even and complete combustion occurs within the AEM. A third advantage is that a substantially more compact unit can be built, especially with regard to the volume of the unit. This aspect is particularly important in the scaling up of this embodiment to medium, large and utility scale systems.

Although described and illustrated in a upright configuration for conventional combustion, one knowledgeable in the art would realize that by inverting the system, i.e. inserting the premixed burner from above and placing the convectional heat exchanger on bottom, a condensed combustion unit would be formed. Therefore, such a configuration suitable for condensed combustion is within the scope of this invention.

In a third specific embodiment of the present invention, the premixed burner directs the fuel/oxidizer mixture inwardly, toward the central axis, and is illustrated in FIG. 8. The burner, as shown, comprises two concentric tubes one inside the other. A person knowledgeable in the art would realize that changing the shape, especially that of the outer tube, i.e., the burner tray 801, is a variation of the present invention and would not substantially affect the function of the invention. The inside tube 802 may be made from perforated refractory metal or ceramic, or refractory metal screen or cloth while the outer tube may be made from metal, ceramic or other suitable materials. A distributive layer, can be on either the inner or the outer surface of the inside tube. Typically the distributive layer comprises a perforated metal cylinder or fabric or felt made of glass, alumina, or ceramic fibers supported by the inside tube. However, it may also consist of, but is not limited to: a vacuum formed composite made of a tube shaped metal screen support and glass, alumina or ceramic fibers; a tube shaped vacuum formed composite of metal tubes and wire screen support and glass, alumina or ceramic fibers; a tube shaped porous refractory ceramic; or, combinations thereof. In the embodiment shown in FIG. 8, the primary radiant heat exchanger 803 is a tube of refractory metal aligned along the central axis, with a plurality secondary heat exchangers 804 integrated into the AEM 805 structure. The AEM structure 805 may be made from, but is not limited to: sheets of refractory metal screen; perforated plates of refractory metal or ceramic; rods or tubes of refractory metal or ceramic; refractory metal wire; a plurality of spirals or concentric cylinders of refractory metal screen or wire; a plurality of tubes or rods of refractory metal or ceramic; a plurality of radially arranged sheets of refractory metal screen, or perforated plates of refractory metal or ceramic; a plurality of disks of refractory metal screen or perforated plates of refractory metal or ceramic arranged so that the flow of gas out of the distributive layer is parallel to the plane of the disks or plates; composite structures made of wires, rods, tubes or screens of refractory metal and glass, alumina or ceramic fibers; or combinations thereof.

Figure 9A:
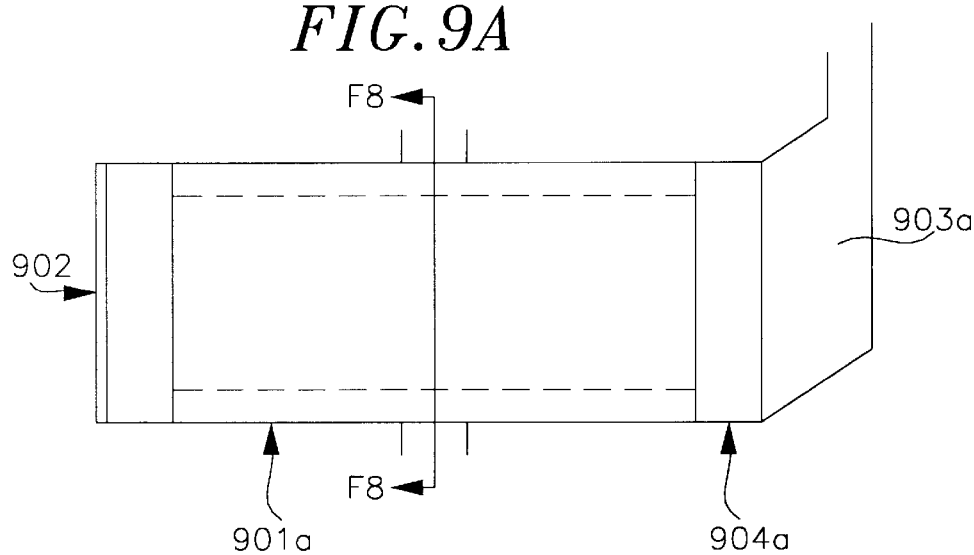
FIGS. 9A and 9B are external illustrations of the third embodiment of the present invention.
Figure 9B:
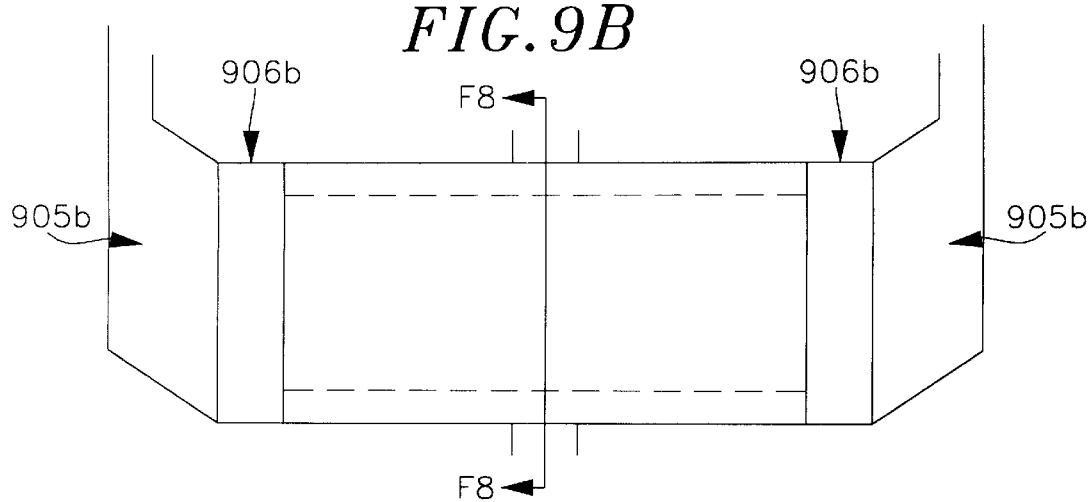

One end of the burner 901(a) may be closed by an end piece 902(a), as shown in FIG. 9a. The end piece may be made of a sheet of reflective metal, a ceramic or metal piece onto which a reflective coating has been placed, a metal plate onto which cooling tubes are attached, or combinations thereof. The exhaust manifold 903(a) and convective heat exchanger 904(a) are on the opposite end to capture the heat in the exhaust gases. If both ends of the burner are open, as shown in FIG. 9(b), dual exhaust manifolds 905(b) may be used with convective heat exchangers 906(b) to recover the heat contained in the exhaust gases.

The fuel/oxidizer mixture 810 is introduced into the burner 801 by means of a blower 811 or a plurality of blowers. Thereafter, the fuel/oxidizer mixture passes through the distributive layer 802 and is ignited just before or within the open spaces of the AEM 805. The combustion process heats the AEM structure, thus generating a radiant heat flux. A cooling agent flowing through both the primary radiant heat exchanger 803 and the secondary heat exchangers 804 removes heat from the system. The exhaust gases flow out either one or both ends and the heat retained in them is recovered by convectional heat exchangers as shown in FIGS. 9(a) and 9(b).

This embodiment is particularly well suited for use in thermophotovoltaic applications. FIG. 8b illustrates such an embodiment. The burner tray 801b, distributive layer 802b and the AEM 805b are the same as described above. In place of the primary heat exchanger, a tube of protective glass 806b inside of which photovoltaic cells 807b have been placed, is used. The photovoltaic cells are protected from the heat generated during combustion by the protective glass 806b and the photovoltaic heat sink 808b. The photons emitted by the AEM structure upon heating are captured by the photovoltaic cells and thus are used to generate electricity.

One knowledgeable in the art would realize that the unit will function in essentially the manner described above regardless of the unit's angular orientation. That is to say, the unit may be stood upright with one end on a surface so that the longitudinal axis is perpendicular to said surface, or the unit may lay flat on a surface with the longitudinal axis parallel to said surface, or positioned so that the longitudinal axis assumes any angle in between. Therefore, such orientations are within the scope of this invention.

One of the primary benefits of this particular embodiment, beside the low $NO_x$ emissions, is realized on the industrial and utility scale. Because the combustion is taking place within the surrounding burner tray, which remains cool due to the flow of the fuel/oxidizer mixture, there is no reason to use refractory bricks or other similar materials to prevent heat from escaping. One knowledgeable in the art would appreciate the cost benefits of such a system.

An AEM, such as that described above and illustrated in FIG. 8b, useful for producing photons within a specific wavelength range, can be made one of at least two ways. Such AEM is formed from a suitable refractory metal, glass, alumina, or ceramic fibers or, combination thereof, that is coated with a superemissive material that is capable of emitting photons within the desired wavelength range. Alternatively, the basic structure itself is formed from a superemissive material that is capable of emitting photons within the desired wavelength range.

A superemissive material can generally be described as a material that, when heated to a threshold temperature, includes one or more electrons that jump to a different electron energy level in quantum increments which causes the emission of visible or infrared radiation in a wavelength band related to the electron's inner electron shell vacancy. Emitted radiation produced as a result of such electron transition is often within a narrow band and can, therefore, be absorbed efficiently by a photovoltaic device, such as silicon cell, indium-gallium-arsenic cell, or the like to produce an output voltage and current. A superemission formed from such thermally-stimulated superemissive material produces radiation in relatively concentrated narrow spectral bands compared to blackbody or greybody emitters which typically exhibit a broadband thermal emission. As a result of the concentrated, narrow spectral band, photons emitted from the superemitter and focused to the photovoltaic power system have greater efficiency than that generated by a blackbody emitter operating at the same heat flux.

Exemplary superemissive materials include those described in U.S. Pat. Nos. 4,776,895, 4,793,799, 4,906,178 and 5,500,054 that are each incorporated herein by reference, such as pure or doped oxides of uranium, aluminum, gallium, zirconium, chromium, neodymium, yttrium, ytterbium, holmium, erbium, thulium, cerium, thorium, or thorium-holmium, aluminum-ytterbium-yttrium mixed oxides, or mixtures thereof, and other materials that emit radiation by an inner electron shell transition. The superemissive material may be selected to emit photons in a predetermined wavelength band or may be selected to emits photons at multiple bands of wavelengths. The use of certain materials increases the useful life, reduces corrosion, and changes the emissivity characteristics of the resultant AEM to those desired for a number of different photovoltaic cell applications.

A superemitter AEM construction comprises an AEM structure is formed from a suitable refractory metal, glass, alumina, or ceramic fibers or, combination thereof, that is coated with a superemissive material. Exemplary high-temperature structural materials include felts made of pure or a mixture of rare earth oxides, rare earth monofiliments such as pure alumina arranged in open three-dimensional configurations, or combinations of these materials. In a preferred superemitter AEM embodiment, the AEM structure is formed from a high purity alumina fiber, such as that available from 3M of Saint Paul, Minn., under the product name Nextel, or from Mitsui Mining Company of Japan, under the product name Almax.

Such high purity alumina fibers are preferred for forming the AEM structure because of their ability to be heated to a very high temperature of about 1,400° C., and display high thermal shock resistance. Such properties are desirable because they minimize the possibility of the superemissive material becoming detached or debonded therefrom during high-temperature operation. Further, such high purity alumina fibers are preferred AEM structural materials because they are known to display low emissivity in the visible wavelength range, thereby facilitating efficient photon emission within the desired wavelength range by the superemissive material coating.

A preferred AEM structure is constructed from a woven cloth of the high purity alumina fiber that is transformed into a screen-like structure by pulling the lines from the cloth. The openings in the cloth have a dimension of approximately 13 millimeters by 13 millimeters. The alumina cloth is coated with a selected superemissive material. In an example embodiment, the superemissive coating material is ytterbia or ytterbium that is prepared by chopping pure ytterbia felt into a powder. The ytterbia powder so formed is mixed with a suitable precursor such as soluble ceramic precursors or mixtures of solubles and insoluble colloidal particles such as alkoxide, nitrates, colloidal hydroxide and alkoxide and/or nitrates. One method for combining the superemissive material with the precursor for subsequent coating by spray or dip process onto the AEM structure is disclosed in U.S. Pat. No. 5,500,054. In an example embodiment the precursor that is used with the superemissive material is an alkoxide. Alkoxide coating methods have been extensively described in the literature, such as those for producing light pipe anti-reflective coatings.

The precursor-superemissive powder mixture is spray applied to the AEM structure and is dried to solidify the soluble material. When using a nitrate precursor, the coating and drying process is followed by a denitration process (or similar process to solidify the soluble material), such as by exposure to ammonia to form the hydroxide or by hydrolysis with $H_2O$ and catalysis for the alkoxide case as described by J. Brinker and W. Scherer in "Sol-Gel Science", Academic Press, NY, N.Y. (1990), and the References in that book identified as 13–21 and 25–37 in Chapter 14, pages 839–880. The application or coating thickness of the superemissive material can vary depending on the particular AEM structure and application. Additionally, the thickness of the superemissive coating will vary as a function of the particular superemissive material selected. However, in an example embodiment, the superemissive thickness can be in the range of from about 0.1 to 10,000 micrometers. A superemissive coating having a thickness of less than about 0.1 micronmeter may produce a lower amount of photon flux than desired for a particular application. A superemissive coating having a thickness of greater than about 10,000 micronmeter may produce a higher amount of photon flux than desired for a particular application.

Figure 19:
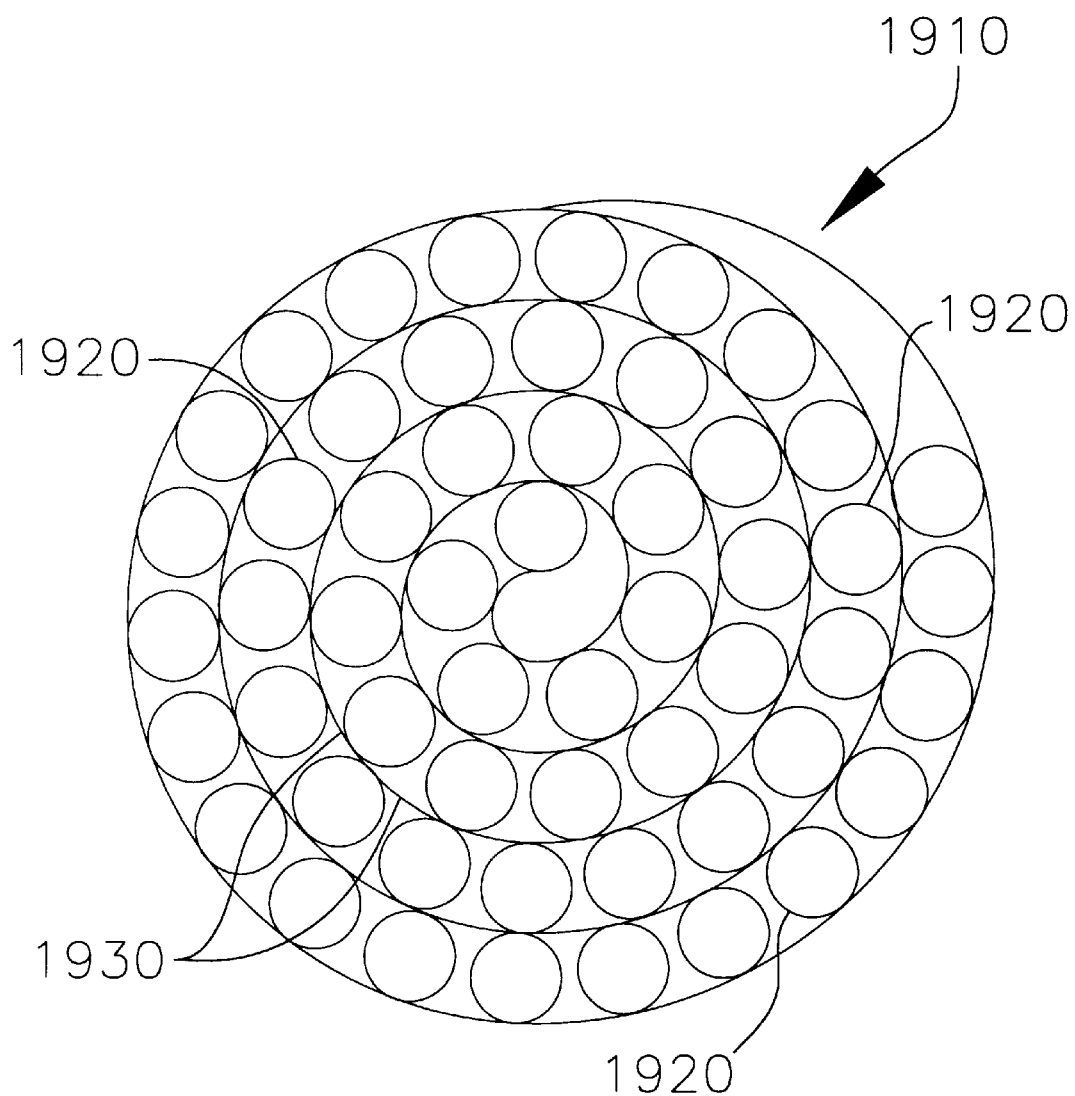
FIG. 19 illustrates an end view of a spiral superemissive AEM prepared according to principles of this invention.

The AEM structure so formed from a single piece of alumina cloth is illustrated in FIG. 3B in the form of a spiral, wherein the space between each layer is approximately 13 millimeters, the AEM diameter is approximately 13 centimeters, and the AEM height is approximately 20 centimeters. Referring to FIG. 19, the AEM structure 1910 includes a plurality of spacers 1920 disposed between each of the cloth layers 1930 to maintain the desired cloth interlayer distance. In an example embodiment, the spacers 1920 are each constructed in the shape of cylindrical rolls formed from the coated alumina cloth material, and have a diameter of approximately 13 millimeters and a length of approximately 6 millimeters. The spacers are positioned within the spiral AEM structure adjacent its top and bottom edges to provide the desired degree of interlayer separation. If desired, the spacers can also be placed at other locations between the top and bottom edges of the AEM structure to maintain the desired interlayer distance throughout the entire length of the AEM.

Another superemissive AEM embodiment is constructed from a number of combined cylinders or tubes that are formed from a suitable refractory metal, glass, alumina, or ceramic fibers or, combination thereof, that is coated with a superemissive material. FIG. 20A illustrates such a tubular AEM structure 2010 comprising an arrangement of a number of tube elements 2020 assembled and connected together. In an example embodiment, the tubular AEM comprises approximately 7 tubes elements. However, it is to be understood that the number of tube elements used to form the tubular AEM will vary depending on the particular AEM size and application.

Referring to FIG. 20B, in an example embodiment, each tube element 2020 is formed from the same high purity alumina cloth material described above for the spiral AEM construction. However, the cloth is selectively woven to provide a desired pattern of openings. Alternatively, each tube element can be constructed having no sidewall openings in the form of a solid tube, depending on particular operating conditions and final AEM application. The tubes are each coated with the same superemissive material described above for the spiral AEM. In an example embodiment, each tube element has a diameter of approximately 13 millimeters and is approximately 76 millimeters high. An exemplary tubular AEM formed from such tube elements has a diameter of approximately 40 millimeters.

Figure 21:
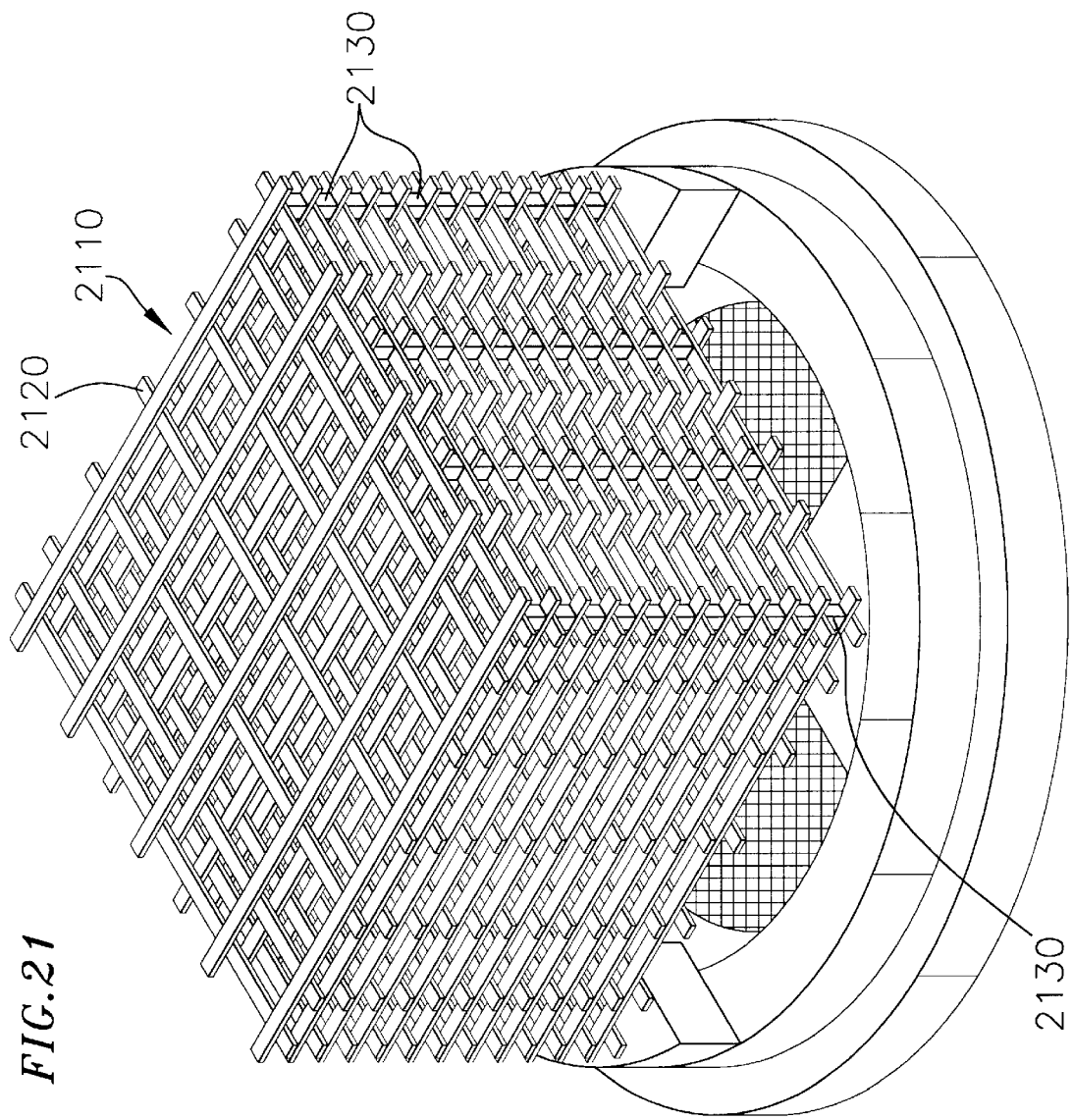
FIG. 21 illustrates a schematic perspective of a three dimensional "log cabin" superemissive AEM prepared according to principles of this invention.

A still other superemissive AEM embodiment is constructed having a three dimensional structure formed from interarranged strips. FIG. 21 illustrates such a "log cabin" AEM structure 2110 constructed from a number of repeating strips 2120. The strips are arranged in a number of different stacked levels, wherein the strips within a single level are arranged parallel but spaced apart from other strips in the same level, and wherein the strips in a level are oriented to be perpendicular to, i.e., oriented 90 degrees to, strips in adjacent levels. Spacers 2130 are formed from strip material and are used to provide the desired stacking distance or interval between the layers of strips.

The exact number of strips used to form the AEM structure 2110 depends on the particular AEM application. The strips 2120 can be formed from a suitable refractory metal, glass, alumina, or ceramic fibers or, combination thereof, that is coated with a superemissive material, such as that described above for the spiral and tube superemissive AEM embodiments. Alternatively, the strips 2120 and spacers 2130 themselves can be formed from a superemissive material, avoiding the need for a subsequent superemissive material coating process. In an example embodiment, the three dimensional "log cabin" superemissive AEM is cubic in shape, measures 12 centimeters by 12 centimeters by 12 centimeters, and is formed from zirconia felt strips that measure 1.3 millimeters thick by 12 centimeters in length. The distance between strips within the same level is approximately 4 centimeters, and the distance between strips in an adjacent level is approximately 2 centimeters. It is to be understood that the shape and dimension of such superemissive AEM embodiment will vary depending on particular application.

In an exemplary embodiment the strips 2120 are formed from a zirconia felt material that are each coated with a ytterbia superemissive material. Zirconia felt was selected as the structural material because of high temperature stability characteristics. A preferred zirconia felt material is one made, for example, by Zircar Products, Inc., of Florida, N.Y., under the product name Zircar. However, it is to be understood that the strips can also be formed from any of the suitable high temperature materials noted above. It is possible to substitute any ceramic felt by pure or mixed rare earth felt in order to fabricate a superemissive AEM. An exemplary superemissive felt fabrication process is disclosed in U.S. Pat. No. 5,662,737, which is incorporated herein by reference. For example, a pure superemissive AEM can be constructed from ytterbia felt strips and arranged in the disclosed three dimensional construction by using a superemissive adhesive as described in U.S. Pat. No. 5,686,368, which is incorporated herein by reference.

Each of the above-described superemissive AEM embodiments are intended to be used with one or more photovoltaic cell, and preferably with a photovoltaic cell array as illustrated in FIG. 8B. Using such AEM embodiment as the photon emitted in such a system is highly advantageous because it results in the efficient production of photons within a narrow wavelength range, under conditions of very high combustion efficiency. For example, superemissive AEMs of this invention are known to burn or combust the fuel with an energy density of approximately 3 million Btu/hr-ft$^3$ (31 W/cm$^3$). Additionally, superemissive AEMs of this invention provide an extremely high radiant flux on a target surface. Measured, in an example embodiment, at approximately 27 W/cm$^3$ at conditions of approximately 15% excess air. At stoichiometry it is expected that the illumination level provided by such superemissive AEMs can be as high as 50 W/cm$^3$.

Other advantages of superemissive AEMs of this invention are their flexibility in being able to facilitate numerous different applications, e.g., to produce a wide range of emitter temperature and radiant profile distribution, by changing the AEM structural density. Superemissive AEMs of this invention also allow operation of a combustion device with a wide turndown ratio, and allow tuning or adjustment of the emission spectrum for particular application by changing the chemistry of the AEM components, e.g., the structural and superemissive materials.

Figures 10A, 10B, 10C, 10D:
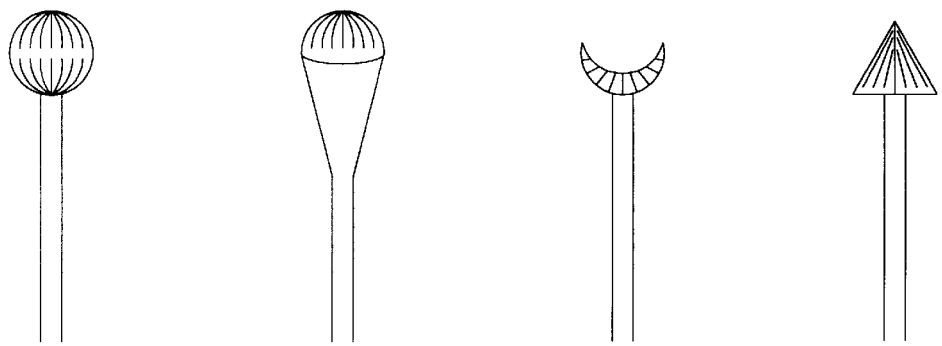
FIGS. 10A to 10D illustrate several three dimensional premixed burners for use with the fourth embodiment of the present invention.

In a fourth specific embodiment, the distributive layer of the premixed burner may have the shape of a convex or concave sphere, convex or concave ¾ sphere, convex or concave hemisphere, conical sphere, cone, three or four sided pyramid, or other similar shapes. FIG. 10 shows several examples, but not necessarily limitations, of this type of premixed burner. A self supporting distributive layer or a distributive layer supported by the perforated surface of burner tray may be used. The distributive layer may be made from, but is not limited to: metal or ceramic cloth; refractory metal wire screen; suitably shaped and perforated refractory metal or ceramic; vacuum formed composites comprising a metal or ceramic support and ceramic, alumina or glass fibers; felt made of ceramic, alumina or glass fibers; or, combinations thereof. The flame front generated by these burners has, for the most part, the same shape as the distributive layer.

Figure 11:
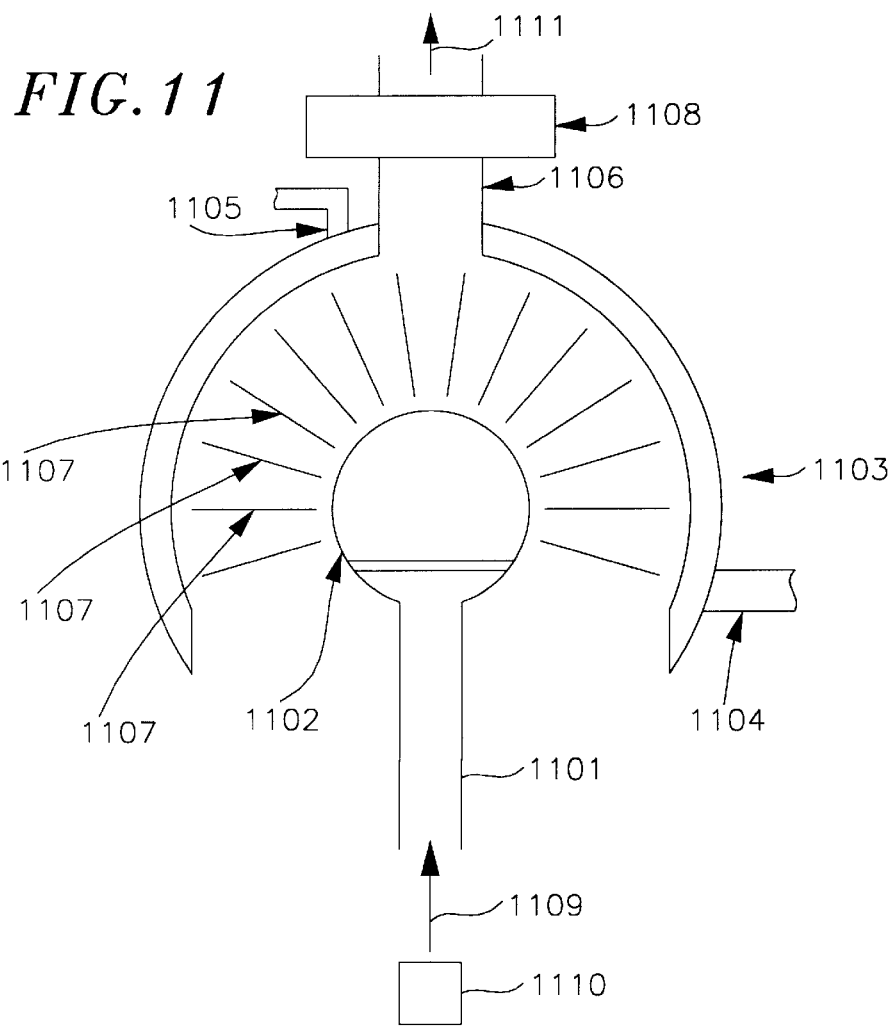
FIG. 11 illustrates in cross-section the fourth embodiment of the present invention with a ¾ sphere burner.

FIG. 11 illustrates the use of a ¾ sphere distributive layer burner according to the principles of the present embodiment. The premixed burner 1101 with a self supporting distributive layer 1102 has been inserted into a radiant heat exchanger. The radiant heat exchanger 1103 has a cooling agent inlet 1104 and a outlet 1105 and a exhaust manifold 1106 on top. The AEM 1107 is arranged around the burner and can be made from, but is not limited to: a plurality concentric spheres of refractory wire screen; a plurality of radially arranged rods or tubes of refractory metal or ceramic; a plurality of refractory metal screen sheets; shaped forms of perforated refractory metal or ceramic; composite structures made of wires, rods, tubes or screens of refractory metal and glass, alumina or ceramic fibers; or combinations thereof. A convective heat exchanger 1108 is used to capture the heat retained by the exhaust gases.

The operation of the illustrated embodiment is described as follows. The fuel/oxidizer mixture 1109 is introduced into the burner 1101 by means of a blower 1110. The mixture passes through the distributive layer 1102 and ignites just before or within the open spaces of the AEM structure 1104. Combustion takes place and the resultant heat is absorbed by the AEM which in turn emits electromagnetic radiation. The radiant energy flux, thus created, is captured by the radiant heat exchanger 1103 which transfers the energy in the form of heat to the cooling agent. The exhaust gases 1111 from the combustion process exit through the exhaust manifold 1106, in which the gases pass through a convective heat exchanger 1108 and out of the system. One knowledgeable in the art would know that the shape of the burner and the shape of the radiant heat exchanger need not be the same as shown in FIG. 11 and such devices are within the scope of this invention.

Figure 12:
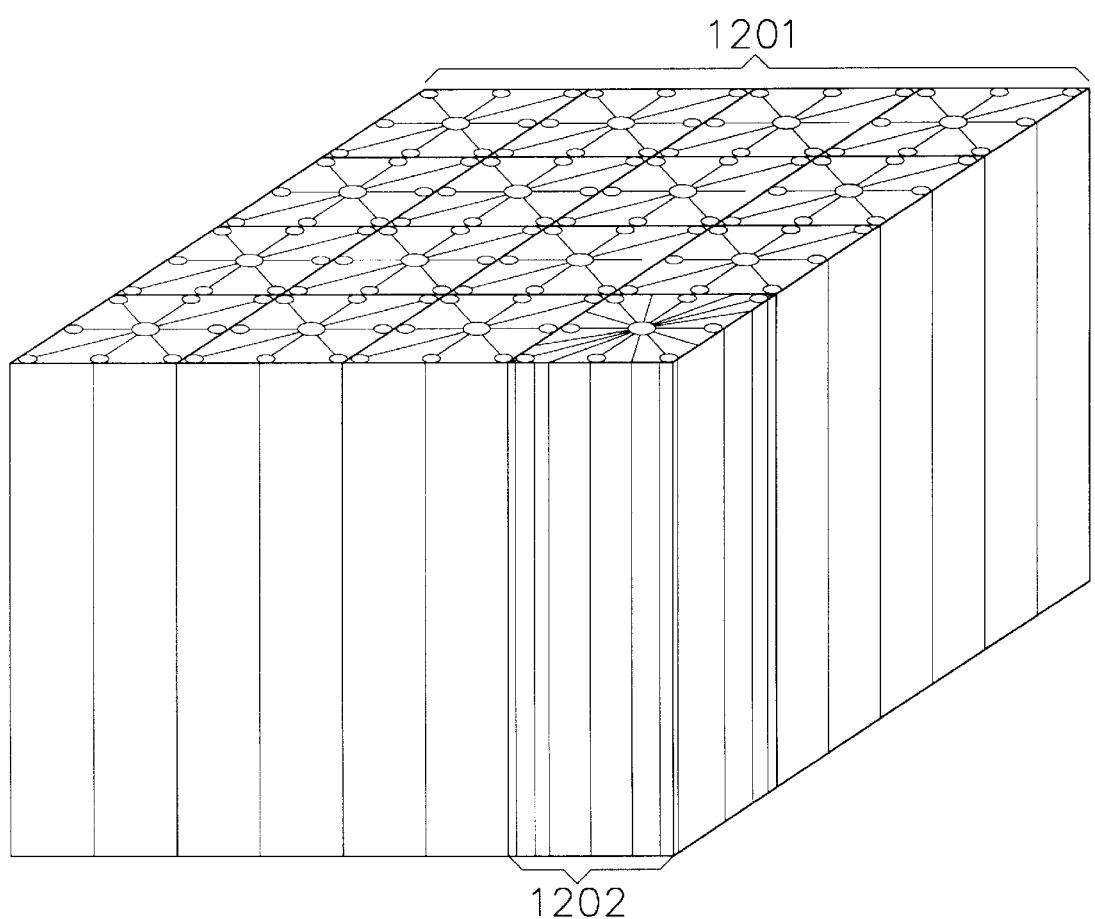
FIG. 12 is a perspective view of the application of modular advanced emissive matrix combustion units.

A fifth embodiment of the present invention is directed towards the application of AEM technology to small industrial, institutional and commercial boilers, steam generators and process heater (i.e., units rated between 2–5,000,000 BTU/hr) and industrial, institutional and commercial boilers, steam generators and process heaters (i.e., units rated equal to or greater than 5,000,000 BTU/hr) sized systems. FIG. 12 illustrates the application of the disclosed invention on this scale using modular AEM units.

Figure 13A:
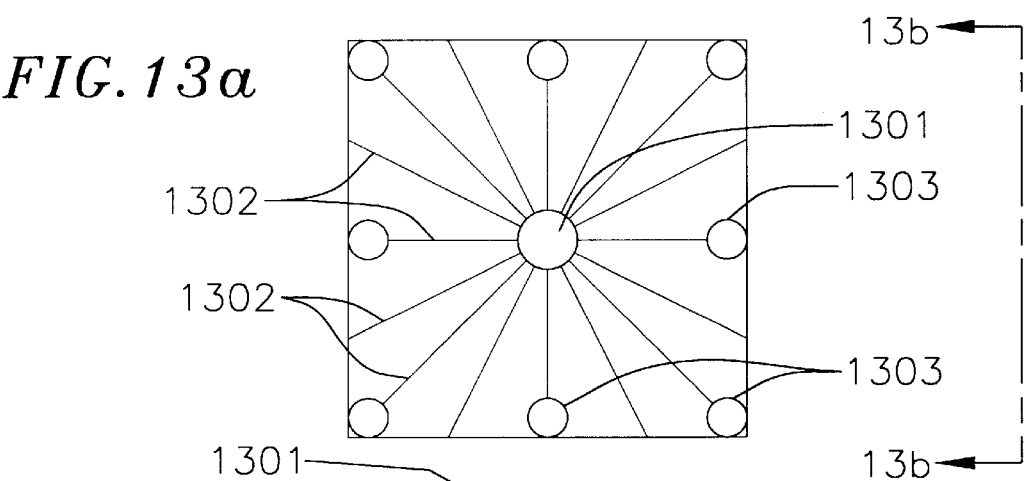
FIGS. 13A and 13B illustrate in cross-section and side view a modular advanced emissive matrix combustion unit with a cylindrically outward firing burner.
Figure 13B:
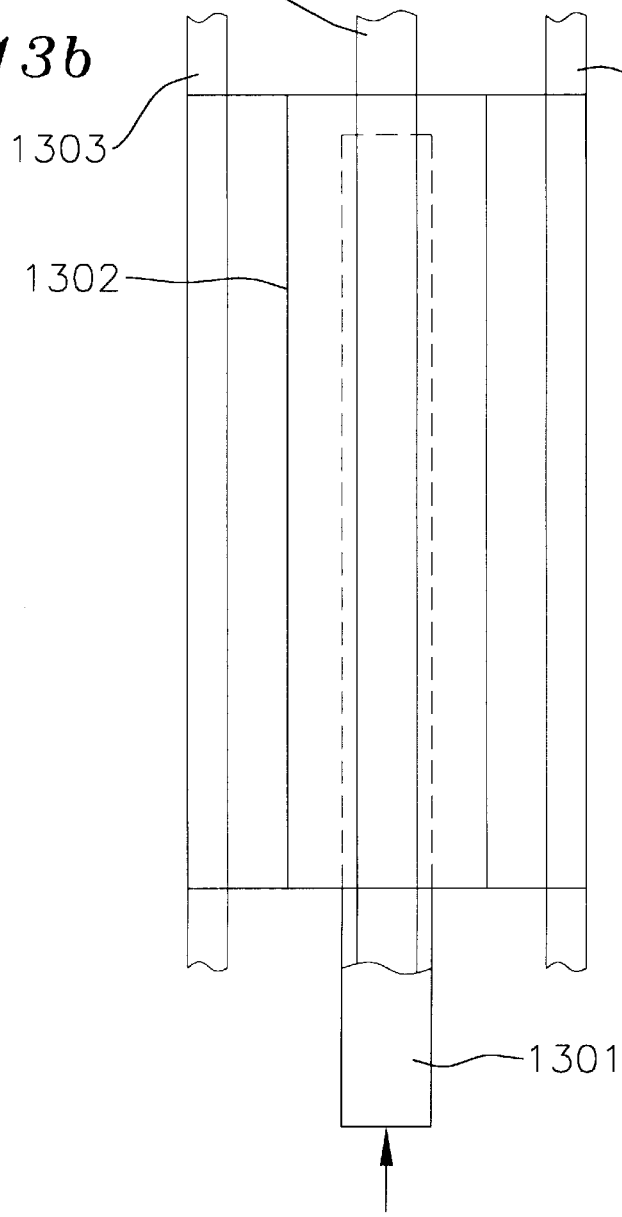

The combustion chamber/fire box 1201 of a utility boiler or steam generation unit with standard surrounding cooling agent tubes 1203 has been fitted with modular AEM units 1202 which are shown in greater detail in FIGS. 13a and 13b. The modular units are evenly spaced throughout the entire combustion chamber to provide the maximum amount of radiant heat., This provides for a uniform release of heat within the volume of the combustion chamber. The modular AEM structure may comprise refractory wire; rods or small tubes of refractory metal or ceramic; sheets of perforated refractory metal or ceramic; vacuum formed composite layers with a refractory metal screen support and glass, alumina, or ceramic fibers; rods or tubes of refractory metal or ceramic; vacuum formed composite layers with rods or tubes of refractory metal or ceramic as a support and glass, alumina or ceramic fibers; or, combinations thereof. As shown in top view in FIG. 13a and side view in 13b, the center of the AEM modular unit has a cylindrical outward firing burner 1301 made from perforated refractory metal or ceramic hollow bodies, composites made of glass, alumina, or ceramic fibers vacuum formed onto a refractory metal screen or perforated refractory metal or ceramic support, or combinations thereof. The AEM 1302 comprises sheets of refractory metal screen or perforated refractory metal or ceramic plates that have been radially arranged around the burner. Through each unit pass a plurality of cooling agent pipes 1303 that serve as the radiant heat exchanger. The modular construction of these units allows for a wide variety of possible arrangement of units within the combustion chamber. As shown in FIG. 12, the units have been packed together to form a 4×4 block of 16 units that completely fills the combustion chamber. However, one knowledgeable in the art would know that by selectively removing units, (e.g. every other one) the combustion chamber would have more open space and a lower total fuel input. Therefore, a wide range of fuel inputs are possible, depending on the number of modular units used. Further, the use of modular units allows for changes in the heating capacity to meet the needs of the customer by either adding or removing modular units.

Figure 14:
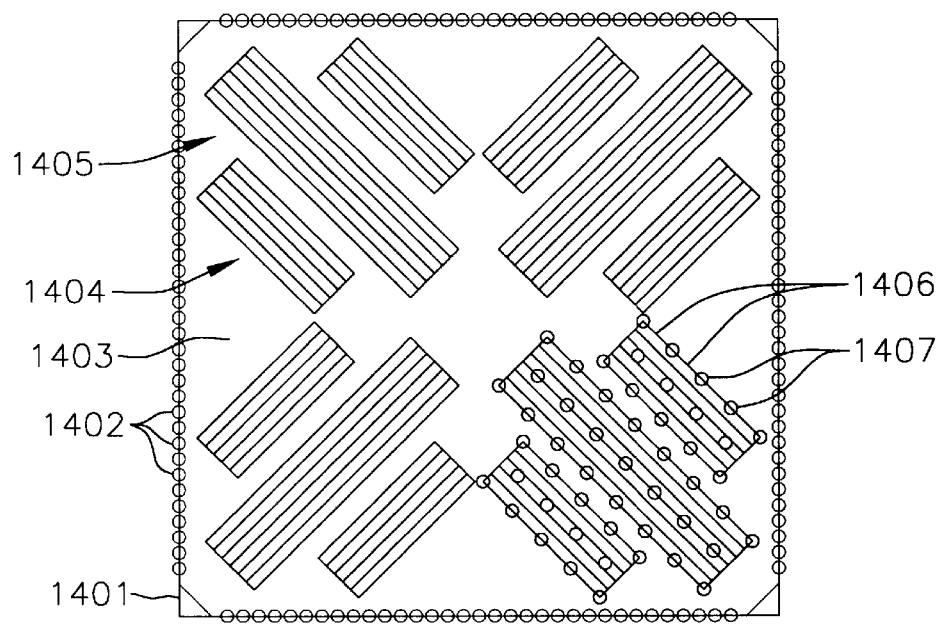
FIG. 14 illustrates in cross-section the application of advanced emissive matrix combustion using modular advanced emissive matrix units on an industrial scale.

The existing burner system need not be replaced as in the description above to be within the scope of the invention. FIG. 14 shows a conventional industrial fire box with rows of burners in each corner 1401 and a plurality of heat absorbing tubes 1402 on the periphery thereby forming a combustion chamber 1403. Modular AEM units 1404 and 1405 have been placed within the combustion chamber to maximize the radiant energy release and minimize the $NO_x$ emissions of combustion. The modular AEM units may comprise: sheets of refractory metal screen; a plurality of perforated plates of refractory metal or ceramic; sheets of refractory metal, ceramic, alumina or glass fiber cloth or felt; composites of glass, ceramic, or alumina fibers supported by refractory metal or ceramic; or combinations thereof. As shown in FIG. 14 and in more detail in FIG. 15, the modular AEM units comprises a plurality of metal or ceramic tubes 1407 with sheets of refractory metal screen 1406 therebetween. The tubes may have a cooling agent flowing within, thereby forming a heat exchanger in combination with the AEM. This embodiment is particularly well suited for the application of AEM technology on a utility scale.

An advanced emissive matrix, AEM is considered to be a three dimensional matrix of actively cooling bodies in the active flame zone that dissipates the energy of combustion, such that for customary operating parameters such as specific fuel input (SFI) and equivalence ratio, the $NO_x$ emissions are reduced by a factor of two as compared to the same burner without the AEM. Such comparisons are suitable only for relatively low fuel input rates since at high fuel input rates the combustion in a burner without an AEM would be unstable. Fuel input rates above about 100,000 $BTU/ft^2/h$ make unstable flames without an AEM. For a flat rectangular burner having a fuel input of 400,000 $BTU/ft^2/h$ and an excess air value of 1.3 the $NO_x$ emissions are reduced by a factor of two as compared to a burner without an AEM.

When a burner is operated within ranges specified by the manufacturer of the burner, that is considered to be customary operating parameters. Such operating ranges may be the ranges customarily used in conventional burners which do not include an AEM, or may be operating ranges selected for efficient operation of a burner including an AEM.

The AEM stabilizes flame in a reduced space in both area and volume as compared with other burners. For example, for the same area of burner, the specific fuel input, i.e. total heat energy of the fuel for a burner with an AEM, can be at least twice the SFI of a powered combustion burner (not a vortex burner). About the best of the powered combustion burners for comparison are surface combustion, porous matrix burners operating in a radiant mode. The proportion of radiant energy (relative to total energy) of such a burner with a superemissive surface is less than 30% without recuperation and up to 50% with recuperation.

Thus, an advanced emissive matrix is considered to be a three dimensional matrix of actively cooling bodies in the active flame zone that dissipates the energy of combustion in a burner area less than half of the area of a burner without an AEM.

Furthermore, the flame in a burner with an AEM downstream from a distributive layer is maintained stable in a volume at least ten times the volume that a stable flame can be maintained in the absence of an AEM. At too low an SFI a flame will be unstable and flash back. At too high an SFI, a flame will be unstable and blow out. There is a limited range of SFI where a flame has a stable combustion zone.

With a porous matrix burner, the stable combustion zone adjacent to the surface when the burner is operating in a radiant mode is in the order of a few millimeters thick normal to the surface, typically less than five millimeters. When such a porous matrix burner operates as a blue flame burner, i.e. when the flame lifts off the surface, the thickness of the stable combustion zone is in the order of one centimeter, however, such a flame tends to be highly variable with thickness varying from less than one centimeter to five centimeters in random patterns over the surface. In other words, the flame is just barely stable. With a similar SFI, a burner with an AEM easily has a stable combustion zone of at least five centimeters thickness normal to the surface of the distributive layer, and one can readily have a stable combustion zone with a thickness of 25 centimeters or more.

Thus, an advanced emissive matrix is considered to be a three dimensional matrix of actively cooling bodies in the active flame zone that dissipates the energy of combustion in a thickness that is at least ten times the thickness (normal to the surface of a distributive layer) of the active flame zone in a porous matrix burner operating in a surface combustion or radiant mode.

An advanced emissive matrix may also be considered to be a three dimensional matrix of actively cooling bodies in the active flame zone that dissipates the energy of combustion, thereby reducing the temperature of the active flame zone sufficiently to result in a $NO_x$ emission equivalent to less than about 30 ppm. For a flat rectangular burner having a fuel input of 400,000 $BTU/ft^2/h$ and an excess air value of 1.3 the $NO_x$ emissions are reduced below 30 ppm.

An advanced emissive matrix may also be considered to be a three dimensional matrix of actively cooling bodies in the active flame zone that dissipates the energy of combustion, such that flame temperature is maintained below about 1500° C. and preferably less than about 1200° C.

An advanced emissive matrix may also be considered to be a three dimensional matrix of actively cooling bodies in the active flame zone that dissipates the energy of combustion, such that the total radiation emitted from the burner is at least 45% of the total combustion energy of the fuel.

An advanced emissive matrix may also be considered to be a three dimensional matrix of actively cooling bodies in the active flame zone that dissipates the energy of combustion, such that when the energy density is as much as 200,000 $BTU/ft^2/h$, the proportion of energy emitted as radiation is more than 40% of the total combustion energy of the fuel.

An advanced emissive matrix may also be considered to be a three dimensional matrix of actively cooling bodies in the active flame zone that dissipates the energy of combustion, such that when the energy density is as much as 400,000 $BTU/ft^2/h$, the proportion of energy emitted as radiation is more than 30% of the total combustion energy of the fuel.

An advanced emissive matrix may also be considered to be a three dimensional matrix of actively cooling bodies in the active flame zone that dissipates the energy of combustion, such that the proportion of radiant energy emitted from the matrix to adjacent heat absorbing surfaces is at least 50% of the radiant energy emitted by surfaces of the matrix bodies. In other words, at least 50% of the area of the matrix bodies is radiating to outside of the matrix.

A two dimensional sheet of material in the active combustion flame zone would not normally be considered an AEM, even though it may emit appreciable radiation. A two dimensional sheet encounters only a portion of the combustion zone without effective cooling of the entire combustion process. A porous matrix burner is not considered to be an AEM since it has a fine pore size and small fiber diameter, resulting in combustion occurring largely at or near the surface of the burner.

Various features and advantages of advanced emissive matrix combustion are demonstrated by the following examples. It is to be understood that these examples merely illustrate the invention and are not intended to limit the scope of the invention which is defined in the claims.

DESCRIPTION OF THE PREFERRED EMBODIMENTS

Several of the following combustion devices utilizing AEM technology were built, tested, and demonstrate the novelty and usefulness of the present invention. The fuel/oxidizer mixture used for all tests was natural gas and ambient air. Based on the experimental data, the following values were calculated as described below:

The experimental measurement of the $NO_x$ level in the exhaust gases were conducted using a Testo-33 made by Testoterm, Inc. of Germany and corrected to 3% $O_2$ using the equation:

$$NO_x(\text{ppm at 3\% } O_2) = NO_x(\text{ppm at } X\% \ O_2) \cdot (20.9-3)/(20.9-X)$$

The value for excess air ($\lambda$) was calculated using the equation:

$$\lambda = 1.00 \cdot \frac{(\text{actual amount of air used})}{(\text{theoretical amount of air required})}$$
(for complete combustion)

For example, a fuel rich flame would have a value less than 1.00, while a fuel lean flame would have a value greater than 1.00.

The radiant heat transfer ($Q_{rad}$), which is a measure of the heat transferred to the cooling agent flowing through the radiant heat exchanger, was calculated using the equation:

$$Q_{rad} = 895.4 \cdot (GPH(\text{coolant})) \cdot \Delta T(\text{coolant})$$

where:
- 895.4 is a conversion factor based on the average heat capacity of the water coolant within the temperature range;
- GPH is the flow rate of the coolant in gallons per hour; and,
- $\Delta T$ is the difference between the temperature of the coolant flowing out and the temperature of the coolant flowing into the radiant heat exchanger.

EXAMPLE 1
100,000 BTU/hr Unit with Round Flat Burner

A prototype water heating unit, as shown in FIG. 2, with a total fuel input of approximately 100,000 BTU/hr was built and tested. The prototype uses a flat round burner with a diameter of about 5 inches. The distributive layer may be made of ceramic fiber cloth, such as Nextel 312 available from 3M Ceramic Materials, St Paul, Minn., or a disk of perforated metal with evenly spaced holes of about 0.0625" in diameter. The latter is preferred because the lower back pressure allows the use of a lower capacity blower. The burner tray/distributive layer was joined to the radiant heat exchanger by means of a flange connection. The radiant heat exchanger was made from two 10" sections of pipe, the inner having an inner diameter (ID) of about 5" and the external pipe having an ID of about 6". Both sections of pipe were welded to a top and bottom flange creating a water tight seal. The external pipe has a water inlet on the lower end and a water outlet on the upper end as shown in FIG. 2. A small passageway through the radiant heat exchanger at the burner end allows for the initial ignition of the fuel air mixture with a hand held propane torch or a hot surface igniter. During operation this passage way was plugged to prevent the escape of the gas/air mixture or the flame. The AEM structure was fabricated of high temperature resistant Kanthal wire screen, with a wire diameter of about 0.028" and 10 mesh available from Belleville Wire Cloth, Co., Cedar Grove, N.J., formed into 5 concentric cylinders with a height of about 7" and having diameters of about ½", 1", 2", 3", and 4", being spaced about 0.50 to 0.75" apart by ceramic spacers. The AEM was suspended above the distributive layer by Kanthal wire at a distance of about 0.5 to 0.75". The convective heat exchanger attached to the top flange of the radiant heat exchanger was of standard design and comprised of copper tubes with integrated copper fins. The exhaust gases, after passing through the convective heat exchanger, were vented through an exhaust manifold equipped with gas sampling probes. A blower, such as a Windjammer(TM) 116643E made by Ametek of Kent, Ohio is used to deliver the natural gas/air mixture to the distributive layer of the burner.

Testing of the above unit occurred under varying conditions of total fuel input (TFI) ($Q_{in}$), measured in BTU/hr, and excess air ($\lambda$). The data from the testing of the unit is presented in Table 1 and represents the average of at least three experimental measurements. The standard deviation of the last unit is given in the parenthesis following the number. Presented in Table 1 are: the average total fuel input ($Q_{in}$); average $NO_x$ concentration in parts per million (ppm) corrected to 3% $O_2$; the average carbon monoxide (CO) concentration (ppm) corrected to dry air free flue gases; the average excess air ($\lambda$); and, the average radiant heat transfer ($Q_{rad}$).

TABLE 1

| Data for 100,000 BTU/hr with Round Flat Burner | | | | |
|---|---|---|---|---|
| $Q_{in}$ (BTU/hr) | $\lambda$ | $NO_x$ (ppm, 3% $O_2$) | CO (ppm) | $Q_{rad}$ (BTU/hr) |
| 100,000 | 1.50(2) | 6(1) | 6(1) | 30,270 |
| 100,000 | 1.36(3) | 16(2) | 0(1) | 29,870 |
| 100,000 | 1.23(1) | 44(2) | 7(1) | 29,840 |
| 100,000 | 1.13(3) | 102(4) | 193(1) | 35,990 |

Figure 16:
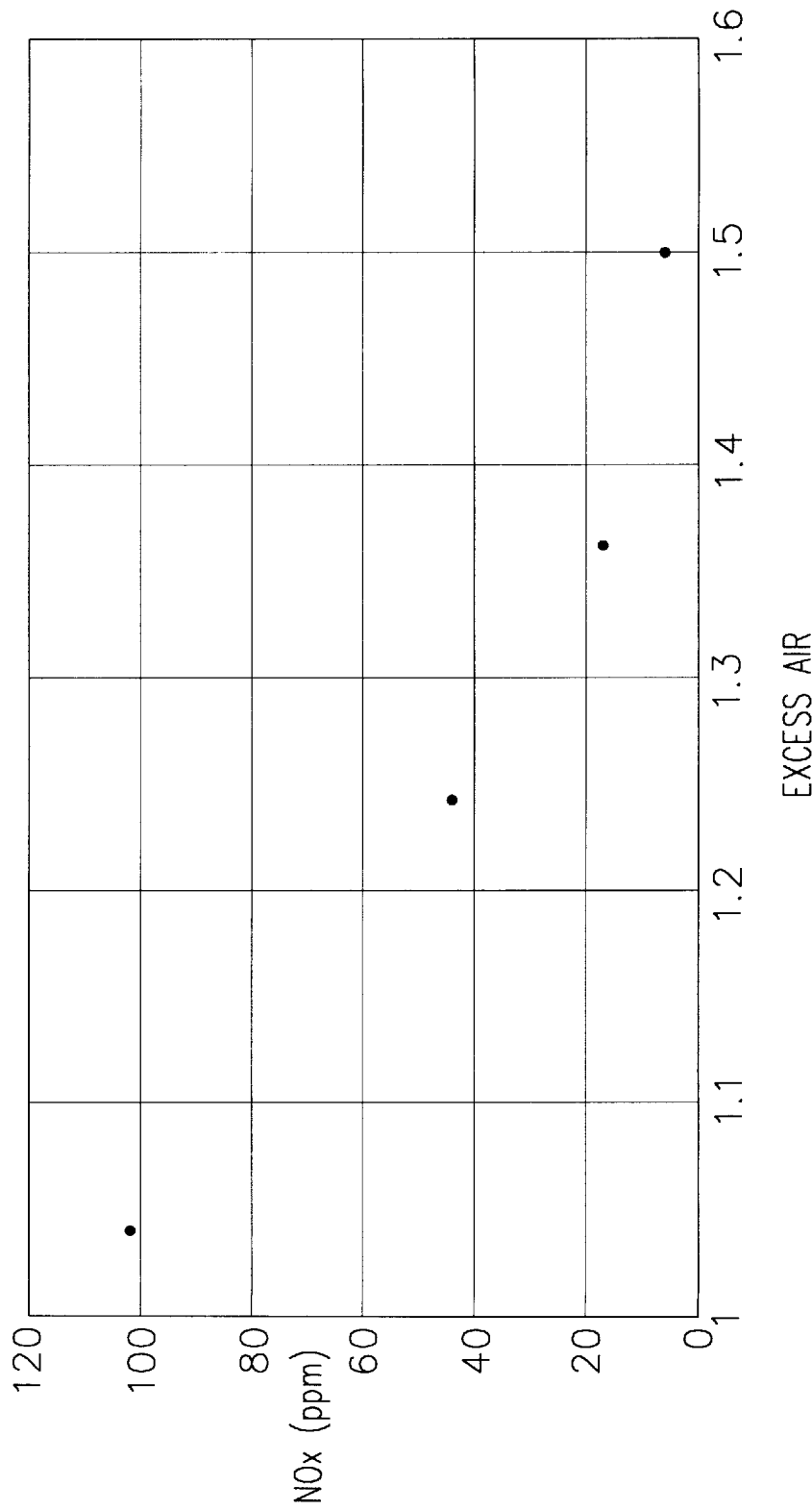
FIG. 16 is a graph of excess air verses $NO_x$ emissions for a prototype 100,000 BTU/hr water heater using advanced emissive matrix combustion.
Figure 17:
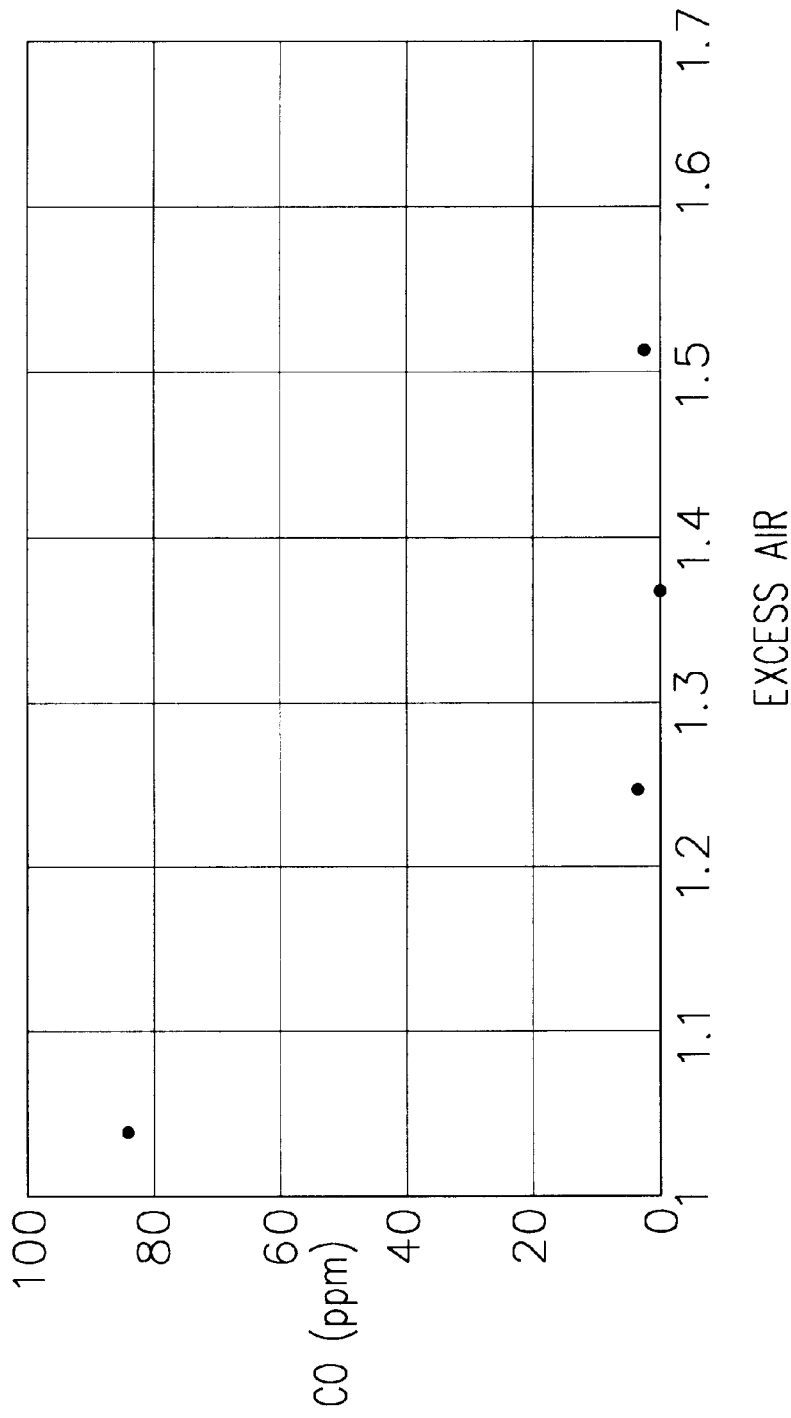
FIG. 17 is a graph of excess air verses CO emissions for a prototype 100,000 BTU/hr water heater using advanced emissive matrix combustion.

A graph of excess air ($\lambda$) verses $NO_x$ concentration (ppm), FIG. 16, shows that the $NO_x$ concentrations are well below the SCAQMD limit of 30 ppm when the excess air is greater than 1.30. Further, levels of $NO_x$ emissions below the CAAA limit of 9 ppm are achieved when the excess air is above 1.48. When the CO concentration (in ppm) is plotted against excess air, as shown in FIG. 17, complete combustion of the fuel occurs as evidenced by the very low CO levels, above $\lambda=1.20$. Finally, when the values for the total fuel input ($Q_{in}$) are compared with the values for the radiant heat transfer ($Q_{rad}$) one can see that approximately 30% of the heat contained in the fuel has been transferred through the radiant heat exchanger to the coolant.

EXAMPLE 2
1,000,000 BTU/hr Unit with Round Flat Burner

Figure 18:
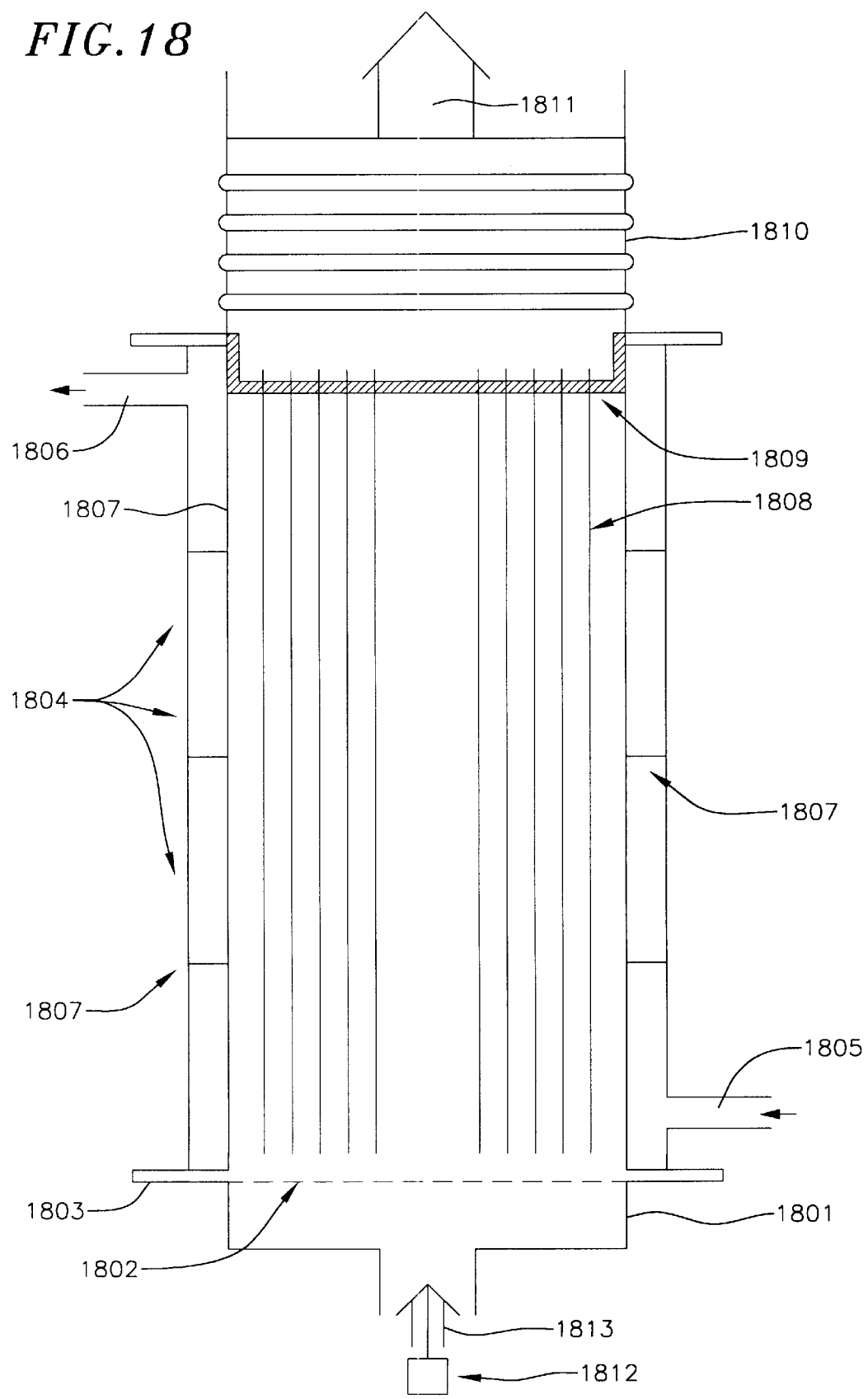
FIG. 18 illustrates in longitudinal cross-section a prototype 1,000,000 BTU/hr water heater using advanced emissive matrix combustion.

A prototype water heating unit, as shown in FIG. 18, with a total fuel input of approximately 1,0007000 BTU/hr was built and tested. The prototype uses a flat round burner 1801 with a diameter of about 14". The distributive layer 1802 may be made of ceramic fiber cloth, such as Nextel 312 available from 3M Ceramic Materials, St Paul, Minn., or a disk of perforated metal with evenly spaced holes of about 0.0625" in diameter. The latter is preferred because the lower back pressure allows the use of a lower capacity blower. The burner was joined to the radiant heat exchanger by means of a flange connection 1803. The radiant heat exchanger 1804 was made form two 48" long sections of pipe, the inner having an ID of about 14" and the external pipe having an ID of about 16". Both sections of pipe were welded to a top and bottom flange, creating a water tight seal. The external pipe has a cooling water inlet 1805 on the lower end and a cooling water outlet 1806 on the upper end of the radiant heat exchanger as shown in FIG. 18. Additional structural support for the radiant heat exchanger is provided by three evenly spaced rows of bolts 1807 welded to both the inner and outer tubes at 4" intervals around the circumference. The AEM structure 1808 was fabricated from high temperature resistant Kanthal wire screen with a wire diameter of about 0.028" and 10 mesh formed into concentric cylinders having a height of about 42" and approximate diameters of 4", 6", 8", 10", and 12", respectively. The AEM was suspended above the distributive layer by Kanthal wire and a 0.5" support rod 1809 so that the distance between the distributive layer and the bottom of the AEM was about 1.0" to 1.5". The convective heat exchanger 1810 attached to the top was of standard design and comprised of copper tubes with integrated copper fins. The exhaust gases 1811, after passing through the convective heat exchanger, were vented through an exhaust manifold equipped with gas sampling probes. A blower 1812, such as a Maxon PL-4250 made by Maxon of Muncie, Ind. was used to deliver the natural gas/air mixture 1813 to the distributive layer of the burner.

Testing of the above unit occurred under varying conditions of total fuel input (TFI) ($Q_{in}$), measured in BTU/hr, and excess air ($\lambda$). The data from the testing of the unit is presented in Table 2. Presented in Table 2 are: the average total fuel input ($Q_{in}$) average $NO_x$ concentration in parts per million (ppm) corrected to 3% $O_2$; the average carbon monoxide (CO) concentration (ppm) corrected to dry air free flue gases; the average excess air ($\lambda$); and, the average radiant heat transfer ($Q_{rad}$).

TABLE 2

Data for 100,000,000 BTU/hr with Round Flat Burner

| $Q_{in}$ (BTU/hr) | $\lambda$ | $NO_x$ (ppm, 3% $O_2$) | CO (ppm) | $Q_{rad}$ (BTU/hr) |
| --- | --- | --- | --- | --- |
| 1,069,997 | 1.92 | 5 | 0 | 228,016 |
| 1,336,999 | 1.64 | 7 | 0 | 476,372 |
| 1,427,005 | 1.54 | 12 | 0 | 586,927 |
| 1,435,000 | 1.46 | 15 | 0 | 551,614 |
| 1,621,980 | 1.36 | 25 | 0 | 623,164 |

The data clearly shows that when the excess air ($\lambda$) is greater than 1.36 the $NO_x$ emissions are below the SCAQMD limit of 30 ppm. When the value for excess air is greater than 1.64, than the $NO_x$ emissions are below the requirements set under the CAAA of 1990 (9 ppm $NO_x$). Under all of the excess air conditions given in the data, the CO emissions are below the measuring capabilities of the instruments indicating complete combustion of the fuel. Finally, when the values for the total fuel input and the radiant heat transfer are compared, the latter value varies between 21% and 38% of the total heat input.

EXAMPLE 3
1,800,000 BTU/hr Teledyne-Laars Unit with AEM Retro-fit

A 1,800,000 BTU/hr Teledyne-Laars MightyTerm(TM) water heater has been retrofitted with AEM technology according to the principles of the present invention. The prototype retro-fitted water heating unit, as shown in FIG. 5, has 6 flat rectangular burners 501 with each burner having a total fuel input of approximately 300,000 BTU/hr that replace the atmospheric burners. The distributive layer 502 of each burner is about 4"×10" and was made of perforated stainless steel with evenly spaced holes having a diameter of 0.0625" placed over the opening in the burner tray. The burner tray is protected from the radiant heat flux generated by the AEM by a sheet of reflective metal 503 to prevent the premature heating of the natural gas/air mixture thereby helping to prevent flashback.

The AEM 504 comprises twenty 10"×12" sheets of Kanthal wire screen, with a wire diameter of about 0.028" and 10 mesh, available from Belleville Wire Cloth, Co., Cedar Grove, N.J., spaced about ½" apart. The AEM was suspended about ¾" to 1" above the distributive layer by ½" metal support rods 505. Refractory metal tubes into which a cooling agent may be caused to flow, thereby forming a radiant heat exchanger, may be used in place of the support rods and would be an obvious variation of this example. The convective heat exchanger 507 was the one that came with the unit as purchased and was unmodified. The natural gas/air mixture was delivered to the distributive layer of the burner by a blower, such as a Windjammer(TM) 116643E made by Ametek of Kent, Ohio.

Testing of the above unit occurred under varying conditions of total fuel input (TFI) ($Q_{in}$), measured in BTU/hr, and excess air ($\lambda$). The data from the testing of the unit is presented in Table 3 and represents the average of at least three experimental measurements. The standard deviation of the last unit is given in the parenthesis following the number. Presented in Table 3 are: the average total fuel input ($Q_{in}$); average $NO_x$ concentration in parts per million (ppm) corrected to 3% $O_2$; the average carbon monoxide (CO) concentration (ppm)corrected to air free dry flue gases; and, the average excess air ($\lambda$).

TABLE 3

Data for 1,800,000 BTU/hr AEM Retro-fit Teledyne-Laars Water Heater

| $Q_{in}$ (BTU/hr) | $\lambda$ | $NO_x$ (ppm, 3% $O_2$) | CO (ppm) |
| --- | --- | --- | --- |
| 1,627,528 | 1.84(5) | 5(1) | 2(1) |
| 1,534,756 | 1.89(7) | 5(2) | 0(1) |

Before the retrofitting process, typical $NO_x$ and CO emissions are about 200 ppm (3% $O_2$) and less than 50 ppm respectively, for this unit. The data presented in Table 3 clearly shows that the retrofitting process substantially decreases the $NO_x$ emissions. In fact, the level of emissions are below the stringent guidelines of the CAAA of 1990 which calls for 9 ppm $NO_x$. The data also clearly demonstrates usefulness of modular systems to produce a value of total fuel input that otherwise would require large capacity blowers, etc. to reach the same TFI using a single burner system.

EXAMPLE 4
100,000 BTU/hr Unit with Cylindrical Outward Firing Burner

A prototype water heating unit, as shown in FIG. 6, with a total fuel input of approximately 100,000 BTU/hr was built and tested in a condensed combustion configuration. The prototype uses a round cylindrical burner with a diameter of about 1⅛" and a length of 6½" inches. The distributive layer may be made of ceramic fiber cloth, such as Nextel 312 available from 3M Ceramic Materials, St Paul, Minn., or a cylinder of perforated metal with evenly spaced holes of about 0.0625" in diameter. The latter is preferred because the lower back pressure allows the use of a lower capacity blower. The burner tray/distributive layer was connected to a round metal end piece having coolant tubes. This assembly was then attached onto the top of the radiant heat exchanger by means of the flange connection so that the burner was inside the radiant heat exchanger. The radiant heat exchanger was made from two 10" sections of pipe, the inner having an inner diameter (ID) of about 5" and the external pipe having an ID of about 6". Both sections of pipe were welded to a top and bottom flange creating a water tight seal. The external pipe has a water inlet on the lower end and a water outlet on the upper end. A small passageway through the radiant heat exchanger at the burner end allows for the initial ignition of the fuel air mixture with a hand held propane torch. During operation this passage way was plugged to prevent the escape of the gas/air mixture or the flame.

Two different AEM structures were fabricated of high temperature resistant Kanthal wire screen, having a mesh of 4 and a wire diameter of about 0.055", available from Belleville Wire Cloth, Co., Cedar Grove, N.J. The first tested AEM structure as shown in FIG. 7a, referred to as the disks AEM, comprised of 19 disks of Kanthal wire screen having a diameter of 4½" and supported by three evenly spaced rods of refractory metal. The first 14 screens at the bottom of the structure had the center portion removed so that open space of about ½" existed between the burner and the leading edge of the AEM. The remaining 5 disks did not have a central hole and served to help stabilize the flame. The second AEM structure as shown in FIG. 7d, referred to as the zigzag AEM, comprised a single sheet of Kanthal wire screen bent to have regular corrugations and formed into a cylinder. The inner peaks of the sheet were separated from the distributive layer by a distance of about ½". Both AEM structures rested on the convective heat exchanger. The convective heat exchanger attached to the bottom flange of the radiant heat exchanger was of standard design and comprised of copper tubes with integrated copper fins. The exhaust gases, after passing through the convective heat exchanger, were vented through a exhaust manifold equipped with gas sampling probes. A blower, such as a Windjammer(TM) 116643E made by Ametek of Kent, Ohio was used to deliver the natural gas/air mixture to the distributive layer of the burner.

Testing of the above unit using the disks AEM and the zigzag AEM occurred under varying conditions of total fuel input (TFI) ($Q_{in}$), measured in BTU/hr, and excess air (λ). The data from the testing of the each unit is presented in Table 4(disk AEM) and Table 5 (finned AEM). Presented in Table 4 and Table 5 are: the average total fuel input ($Q_{in}$); average $NO_x$ concentration data in parts per million (ppm) corrected to 3% $O_2$; the average carbon monoxide (CO) concentration (ppm) corrected to air free dry flue gases; the average excess air (λ); and, the average radiant heat transfer ($Q_{rad}$).

TABLE 4

Data for 100,000 BTU/hr with Cylindrical Outward Firing Burner (Disk AEM)

| $Q_{in}$ (BTU/hr) | λ | $NO_x$ (ppm, 3% $O_2$) | CO (ppm) | $Q_{rad}$ (BTU/hr) |
| --- | --- | --- | --- | --- |
| 100,674 | 1.70 | 6 | 12 | 37,607 |
| 101,775 | 1.63 | 6 | 12 | 37,607 |
| 104,938 | 1.60 | 6 | 15 | 44,590 |
| 113,433 | 1.51 | 10 | 12 | 36,711 |

TABLE 5

Data for 100,000 BTU/hr with Cylindrical Outward Firing Burner (Zigzag AEM)

| $Q_{in}$ (BTU/hr) | λ | $NO_x$ (ppm, 3% $O_2$) | CO (ppm) | $Q_{rad}$ (BTU/hr) |
| --- | --- | --- | --- | --- |
| 105,435 | 1.39 | 20 | 31 | 29,548 |
| 104,771 | 1.59 | 8 | 100 | 22,162 |
| 104,061 | 1.81 | 5 | 357 | 22,161 |
| 134,905 | 1.40 | 24 | 41 | 36,935 |
| 134,213 | 1.61 | 8 | 84 | 29,548 |
| 133,309 | 1.81 | 5 | 266 | 29,548 |

For both configurations of AEM, disk or zigzag, the $NO_x$ emissions are below the SCAQMD regulatory limit of 30 ppm for a wide range of excess air values. When the excess air is greater than about 1.60 the levels of $NO_x$ are at a level below the CAAA of 1990 (i.e., 9 ppm). Both AEM structures provide a radiant heat source that is superior to the analogous atmospheric or open flame burner systems. This conclusion is supported by the comparison of the values for the radiant heat output ($Q_{rad}$) with the corresponding values for the total fuel input ($Q_{in}$).

EXAMPLE 5
Cylindrical Inward Firing Burner

Figure 8A:
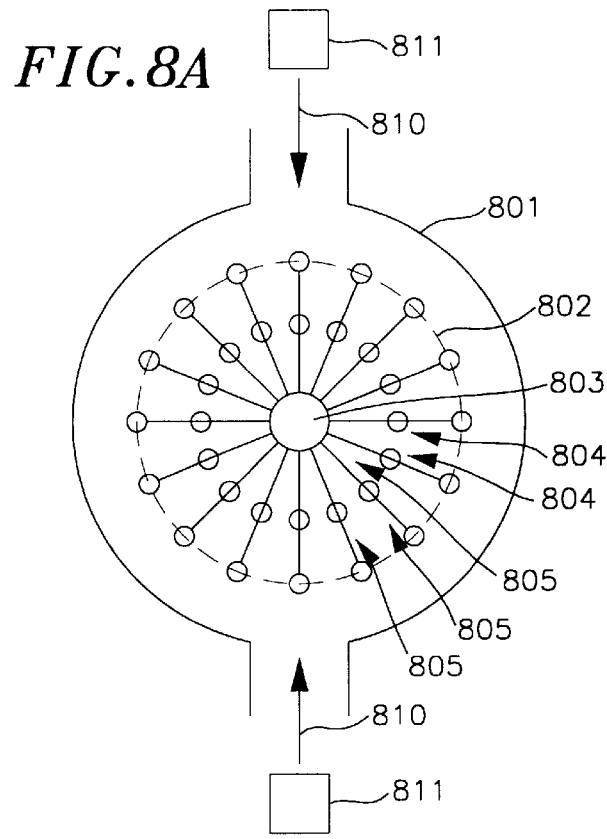
FIGS. 8A and 8B are cross-sectional illustrations of the third embodiment of the present invention using a cylindrical inward firing burner.
Figure 8B:
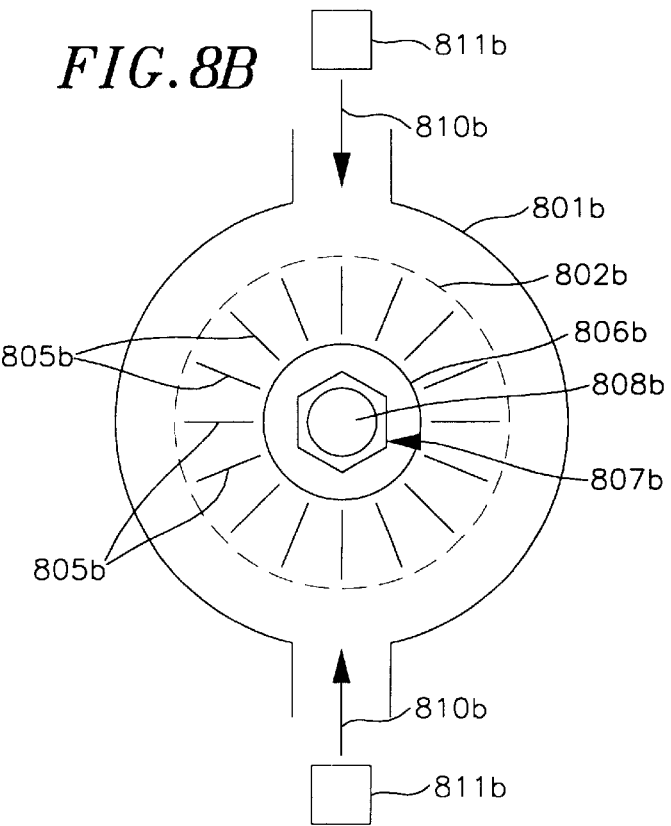

A prototype cylindrical inward firing burner unit is shown in FIG. 8a. The burner comprises a cylindrical burner tray inside of which a cylindrical ceramic fiber/metal composite is the distributive layer. The composite distributive layer comprises a metal screen and a plurality of axially arranged metal coolant tubes. The addition of the coolant tubes to the distributive layer helps prevent flashback of the natural gas/air mixture. The AEM structure comprises a plurality of axially arranged coolant tubes in between which are sheets of Kanthal wire screen. The tubes that are integrated into the AEM structure serve as radiant heat exchanger elements. In the preferred embodiment, the unit is upright on one end, standing on a end piece comprising a metal plate and coolant tubes. The unit has a single convective heat exchanger for recovery of the heat within the exhaust gases and an exhaust manifold for directing the exhaust gases away. Based on the previous experimental data, one knowledgeable in the art would conclude that the above described unit would have low $NO_x$ emissions under conditions of excess air.

EXAMPLE 6
Modular Advanced Emissive Matrix Unit with Cylindrical Outward Firing Burner A prototype modular AEM burner unit suitable for retrofitting industrial and utility scale water heaters, steam generators and other process heat units is shown in FIG. 13. The modular unit comprises a cylindrical outward firing burner 1301, an AEM structure 1302 radially arranged around the burner, and metal or ceramic tubes 1303 in which a cooling agent is caused to flow. The selection of the distributive layer is highly dependent on the fuel/oxidizer mixture that is used. In this preferred embodiment, a natural gas/air mixture is used and the preferred distributive layer is a 6" diameter cylinder of perforated metal with evenly spaced holes of about 0.0625" in diameter. The AEM 1302 comprises refractory metal screen that is self supporting. One vertical edge of the screen is in connected and supported by the burner while the other vertical edge is connected to and supported by the coolant pipes 1303 of the radiant heat exchanger. The coolant pipes of the radiant heat exchanger are about 3" in diameter. The modular units are of sufficient height and size to fit inside the combustion chamber. When multiple units are installed, either a plurality of blowers are used so that each burner unit has its own blower or a blower manifold may be used to control the flow of the fuel/air mixture. By doing this modular units may be added or subtracted as need dictates. Further, this allows for the distribution of the natural gas/air mixture to different sections of the combustion chamber resulting in a more uniform heat distribution.

Figure 15:
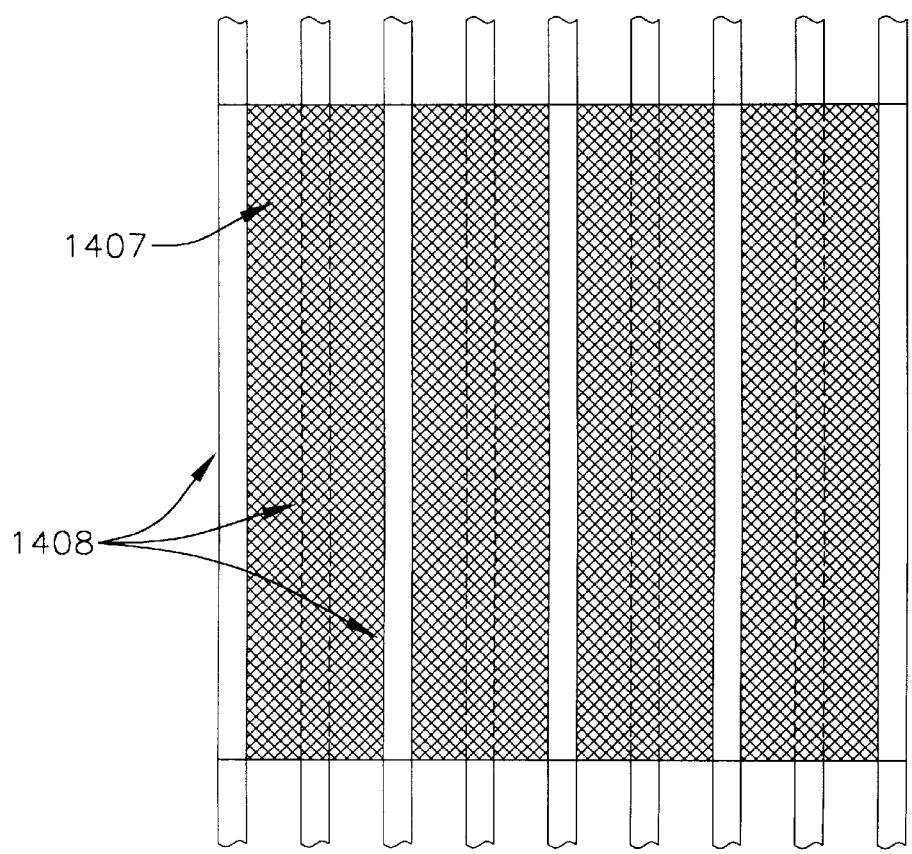
FIG. 15 illustrates in side view a modular advanced emissive matrix unit for use on an industrial scale.

EXAMPLE 6
Modular Advanced Emissive Matrix Unit for use with Existing Burner Systems A prototype modular AEM burner unit suitable for large industrial and utility scale water heaters, steam generators and other process heat units is shown in FIG. 15. The modular unit comprises a plurality of vertical sheets of refractory metal wire screens supported by 3" coolant pipes. The application of such a modular unit is shown in FIG. 14 where the existing banks of burners 1401 and 3" coolant pipes are not replaced. The modular AEM units are arranged in the combustion chamber 1403 so that the fuel/air mixture passes parallel to the plane formed by the sheets of the AEM. As shown in the figure, each bank of burners has its own set of modular AEM units. By placing the modular AEM units within the combustion chamber, the flame zone becomes more dispersed and the radiant heat generated by the AEM system cools the area. By doing this, the formation of thermal $NO_x$ is significantly reduced.

The present invention has been described in relation to limited working embodiments and examples which are for illustrative purposes. Although a number of embodiments have been described and illustrated herein, it will be apparent to those skilled in the art that further variations can be made. The materials of construction are exemplary and other high temperature materials may clearly be substituted. Thus, the invention may be practiced otherwise than specifically described. Therefore, the present invention is defined by the following claims.

What is claimed is:

1. A superemissive combustion device comprising:
   a porous distributive layer;
   a superemissive advanced emissive matrix in the active flame zone downstream from the porous distributive layer, the emissive matrix being a three dimensional matrix of radiating bodies having an open matrix structure occupying a substantial portion of the active flame zone to create a range of combustion mixture velocities therein, the emissive matrix being optically thin to electromagnetic radiation and comprising a superemissive material to emit photons within a predetermined wavelength range when thermally stimulated; and
   a means for delivering a fuel/oxidizer mixture to an upstream face of the porous distributive layer.

2. A device as recited in claim 1 wherein the structure of the advanced emissive matrix comprises high temperature materials selected from the group consisting of: refractory metal wire, refractory metal rod, refractory metal tube, perforated refractory metal; ceramic rod; ceramic tube; perforated ceramic; a composite structure made of a support and ceramic fibers; a composite structure made of a support and alumina fibers; a composite structure made of a support and glass fibers; and combinations thereof.

3. A device as recited in claim 2 wherein the superemissive material is coated onto the advanced emissive matrix.

4. A device as recited in claim 1 wherein the advanced emissive matrix is formed from the superemissive material.

5. A device as recited in claims 3 or 4 wherein the superemissive material is selected from the group consisting of pure or doped oxides of uranium, aluminum, gallium, zirconium, chromium, neodymium, yttrium, ytterbium, holmium, erbium, thulium, cerium, thorium, thorium-holmium, aluminum-ytterbium-yttrium mixed oxides, and mixtures thereof.

6. A device as recited in claim 1 further comprising at least one photovoltaic device positioned adjacent the advanced emissive matrix to receive photon emissions.

7. A device as recited in claim 1 wherein the advanced emissive matrix comprises a body structure that is in the form of a spiral made from a high-temperature material.

8. A device as recited in claim 1 wherein the advanced emissive matrix comprises a body structure that is in the form of a bundle of tube elements each made from a high-temperature material.

9. A device as recited in claim 1 wherein the advanced emissive matrix comprises a body structure that is in the form of a cubical three dimensional arrangement formed from repeating layers of strips each made from a high-temperature material.

10. A device as recited in claim 1 wherein the emissive matrix dissipates sufficient energy of combustion for maintaining the temperature of an active flame zone downstream from the distributive layer between 800° C. and 1500° C.

11. A device as recited in claim 1 wherein the emissive matrix dissipates sufficient energy of combustion for maintaining a stable active flame zone at least ten times greater than the volume that a stable flame can be maintained in the absence of the matrix.

12. A superemissive combustion device comprising:
   a porous distributive layer;
   means for introducing a combustible fuel/oxidizer mixture at sufficient velocity that the fuel/oxidizer mixture passes through the porous distributive layer to a downstream face of the distributive layer;
   a three dimensional matrix of actively radiating bodies disposed downstream from the porous distributive layer and within an active flame zone of the device, wherein the matrix comprises a plurality of open spaces positioned through a substantial portion of the active flame zone, the matrix comprising a superemissive material that emits photons within a defined wavelength range when thermally stimulated, and wherein the matrix dissipates the energy of combustion of the fuel/air mixture and maintains the following conditions within the active flame zone:

a range of combustible mixture velocities that is wider than the range of flame propagation velocities;

multiple vortex zones of varying intensity within the combustible mixture; and combinations thereof, thereby stabilizing the active flame zone within the open spaces of the matrix.

13. A combustion process for reducing the $NO_x$ emissions of a combustion device and emitting photons within a predetermined wavelength range comprising the steps of:

delivering a combustible mixture to a combustion device;

passing the combustible mixture through a plurality of openings within a three-dimensional emissive matrix disposed substantially alone an active flame zone in the device, the matrix creating a range of combustible mixture velocities in the flame zone that is wider than the range of the flame propagation velocities in the combustible mixture;

creating and maintaining multiple vortex zones of varying intensity within the combustible mixture;

dissipating combustion energy away from the flame zone in the form of electromagnetic radiation by way of radiating bodies in the matrix that are optically thin to electromagnetic radiation; and emitting photons within a predetermined wavelength range from the radiating bodies by way of thermally stimulating a superemissive material used to form the matrix.

14. A combustion process for reducing $NO_x$ emission from a fuel/oxidizer combustion device and emitting photons within a predetermined wavelength range comprising the steps of:

passing a fuel/oxidizer mixture through a porous distributive layer;

combusting the mixture within open spaces of a three dimensional matrix made of actively cooling bodies, the matrix being positioned along an active flame zone and comprising a superemissive material;

cooling the active flame zone so that the temperature of the active flame zone is in the range of from 800° C. to 150° C.; and emitting photons within a predetermined wavelength range upon thermally stimulating the superemissive material.

15. A superemissive combustion device comprising:

a porous distributive layer;

means for introducing a fuel/oxidizer mixture at sufficient velocity that the fuel/oxidizer mixture passes through the porous distributive layer to a downstream face of the distributive layer; and a three dimensional matrix of actively radiating bodies positioned within an active flame zone of the device downstream from the porous distributive layer, the radiating bodies having an open matrix structure that extends along a substantial portion of the active flame zone for dissipating sufficient energy of combustion to maintain the temperature of the active flame zone between 800° C. and 1500° C., wherein the matrix comprises superemissive material for emitting photons within a predetermined wavelength range.

16. A device as recited in claim 15 wherein the matrix comprises means for dissipating the energy of combustion by emission of radiant energy out of the matrix and by convective transfer of energy within the matrix.

17. A device as recited in claim 15 wherein the matrix of radiating bodies provides emission of radiant energy out of the matrix that is at least 25% of the total combustion energy of the fuel entering the device.

18. A device as recited in claim 15 wherein the matrix of radiating bodies provides emission of radiant energy out of the matrix that is at least 45% of the total combustion energy of the fuel entering the device.

19. A device as recited in claim 15 further comprising at least one further device selected from the group consisting of:

a burner tray having an upper edge and an opening for accepting the fuel/oxidizer mixture, the upper edge being in supportive contact with a receiving face of the porous distributive layer which receives the fuel/oxidizer mixture;

a radiant heat exchanger surrounding at least a portion of the matrix for absorbing and transferring radiant energy emitted from the matrix to a cooling fluid flowing within the radiant heat exchanger;

a convective heat exchanger downstream from the matrix for absorbing and transferring heat of combustion contained in gases exhausted from the matrix to a cooling fluid flowing within the convective heat exchanger; and one or more photovolatic cells for receiving photon emissions from the matrix and converting to same to electricity.

20. A device as recited in claim 15 wherein the three dimensional matrix of actively radiating bodies is made of high temperature resistant materials selected from the group consisting of: refractory metal wire, rods, or tubes; refractory metal cloth or felt; refractory metal screen; perforated disks of plates of refractory metal; ceramic rods or tubes; ceramic cloth or felt; ceramic screen; perforated disks or plates of ceramic; porous composite structures of ceramic fibers and refractory metal; and combinations thereof.

21. A device as recited in claim 15 wherein the matrix comprises:

a body structure that is formed from actively radiating bodies is made of high temperature resistant materials selected from the group consisting of: refractory metal wire, rods, or tubes; refractory metal cloth or felt; refractory metal screen; perforated disks of plates of refractory metal; ceramic rods or tubes; ceramic cloth or felt; ceramic screen; perforated disks or plates of ceramic; porous composite structures of ceramic fibers and refractory metal; and combinations thereof; and a coating of the superemissive material on the body structure.

22. A device as recited in claim 15 wherein the matrix comprises a body structure that is formed from the superemissive material.

23. A device as recited in claims 15, 21 or 22 wherein the superemissive material is selected from the group consisting of pure or doped oxides of uranium, aluminum, gallium, zirconium, chromium, neodymium, yttrium, ytterbium, holmium, erbium, thulium, cerium, thorium, thorium-holmium, aluminum-ytterbium-yttrium mixed oxides, and mixtures thereof.

* * * * *